US009768832B2

(12) United States Patent
Nishibayashi et al.

(10) Patent No.: US 9,768,832 B2
(45) Date of Patent: Sep. 19, 2017

(54) POWER ELECTRONICS DEVICE, COOPERATIVE CONTROL METHOD AND NON-TRANSITORY COMPUTER READABLE MEDIUM

(71) Applicant: KABUSHIKI KAISHA TOSHIBA, Tokyo (JP)

(72) Inventors: Yasuyuki Nishibayashi, Kawasaki (JP); Kotaro Ise, Kawasaki (JP); Takafumi Sakamoto, Tokyo (JP); Yuji Tohzaka, Kawasaki (JP); Ikuya Aoyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 762 days.

(21) Appl. No.: 14/210,862

(22) Filed: Mar. 14, 2014

(65) Prior Publication Data

US 2015/0063473 A1     Mar. 5, 2015

(30) Foreign Application Priority Data

Aug. 30, 2013 (JP) ................. 2013-180443

(51) Int. Cl.
*H02J 13/00* (2006.01)
*H04B 3/54* (2006.01)
*H04L 25/49* (2006.01)

(52) U.S. Cl.
CPC .............. *H04B 3/542* (2013.01); *H02J 13/00* (2013.01); *H04L 25/49* (2013.01); *H04L 25/4902* (2013.01); *H04B 2203/5495* (2013.01)

(58) Field of Classification Search
CPC ..... H02J 3/32; H02J 3/38; H02J 3/386; G05B 19/0423; G05B 2219/2237; G05B 2219/2639
See application file for complete search history.

(56) References Cited

U.S. PATENT DOCUMENTS

| 8,058,836 | B2 | 11/2011 | Ichikawa et al. |
| 9,385,528 | B2 * | 7/2016 | Nishibayashi ............ H02J 1/00 |
| 9,465,378 | B2 * | 10/2016 | Nishibayashi ..... G05B 19/0423 |
| 2009/0322154 | A1 * | 12/2009 | Ichikawa .............. B60L 11/123 307/82 |

(Continued)

FOREIGN PATENT DOCUMENTS

| JP | H10-94174 | 4/1998 |
| JP | 2003-229892 | 8/2003 |

(Continued)

OTHER PUBLICATIONS

"News on IEC 61850 and related Standards: Plug and Play for IEC 61850—Supported by Siemens," Tuesday, Oct. 11, 2011; http://blog.iec61850.com/2011/10/plug-and-play-for-iec-61850-patent.html [retrieved from the Internet Aug. 26, 2014].

(Continued)

*Primary Examiner* — Jeffrey Shin
(74) *Attorney, Agent, or Firm* — Nixon & Vanderhye, P.C.

(57) ABSTRACT

According to one embodiment, there is provided a power electronics device in which a selects a first power electronics device and a second power electronics device from power electronics devices, based on power attribute information and communication attribute information of each power electronics device, and the first power electronics device is a master of power allocation control of electric energy that the power electronics devices connected to one power line of power lines perform input and output on the one power line, and the second power electronics device is a master of output power phase synchronization control of power which the power electronics devices connected to the one power line outputs to the one power line.

16 Claims, 39 Drawing Sheets

(56) References Cited

U.S. PATENT DOCUMENTS

| | | | |
|---|---|---|---|
| 2011/0140649 A1* | 6/2011 | Choi | ................... H01M 14/005 320/101 |
| 2014/0071807 A1 | 3/2014 | Tohzaka et al. | |
| 2014/0077596 A1 | 3/2014 | Nishibayashi et al. | |
| 2014/0077597 A1 | 3/2014 | Nishibayashi et al. | |
| 2014/0119080 A1 | 5/2014 | Sakamoto et al. | |
| 2014/0241021 A1 | 8/2014 | Ueno et al. | |
| 2014/0241270 A1 | 8/2014 | Tohzaka et al. | |
| 2014/0288718 A1 | 9/2014 | Nishibayashi et al. | |
| 2014/0288719 A1 | 9/2014 | Kanayama et al. | |

FOREIGN PATENT DOCUMENTS

| | | |
|---|---|---|
| JP | 2003-348851 | 12/2003 |
| JP | 2004-173388 | 6/2004 |
| JP | 2008-035665 | 2/2008 |
| JP | 2014-057199 | 3/2014 |
| JP | 2014-060854 | 4/2014 |
| JP | 2014-060855 | 4/2014 |
| JP | 2014-087244 | 5/2014 |
| JP | 2014-165805 | 9/2014 |
| JP | 2014-166040 | 9/2014 |
| JP | 2014-183661 | 9/2014 |
| JP | 2014-207847 | 10/2014 |

OTHER PUBLICATIONS

Otani, Tetsuo et al, "A Plug and Play Method for Maintenance Support System to Streamline System Configurations at Sensor Connection," System Engineering Research Laboratory Rep.No. R10023, pp. i-16, 2011.

* cited by examiner

| INFORMATION TYPE | REMARKS |
|---|---|
| UNIT NUMBER | UNIQUE CODE OF EACH DEVICE (SUCH AS SERIAL NUMBER) |
| UNIT TYPE | EMS, INV(AC/DC): ENERGY STORAGE, INV (AC/DC): SOLAR, INV(AC/DC), INV(DC/DC): ENERGY STORAGE, INV(DC/DC): SOLAR, INV(DC/DC)AND SMART METER ※IN ORDER OF MASTER PRIORITY(CONNECTION TO AN ALTERNATIVE CURRENT SYSTEM, ENERGY STORAGE/SOLAR HOUSING) |
| COMMUNICATION WIRE CONNECTION | DEVICES LOCATED IN SAME COMMUNICATION BROADCAST DOMAIN |
| POWER WIRE CONNECTION | DEVICES LOCATED ON SAME BUS LINE |
| POWER ALLOCATION CONTROL MASTER/SLAVE | MASTER: DEVICE OF CONTROL SUBJECT SLAVE: DEVICE ON CONTROLLED SIDE |
| OUTPUT POWER PHASE SYNCHRONIZATION CONTROL MASTER/SLAVE | MASTER: DEVICE OF CONTROL SUBJECT SLAVE: DEVICE ON CONTROLLED SIDE |

FIG.11

| UNIT NUMBER | UNIT TYPE | COMMUNICATION WIRE CONNECTION | POWER WIRE CONNECTION | MASTER/SLAVE |
|---|---|---|---|---|
| 1 | INV(AC/DC) | 2,3 | 2,3 | M:NOTHING S:2,3 |
| 2 | INV(AC/DC) | 1,3 | 1,3 | M:1 S:NOTHING |
| 3 | INV(AC/DC) | 1,2 | 1,2 | M:1 S:NOTHING |

FIG.12

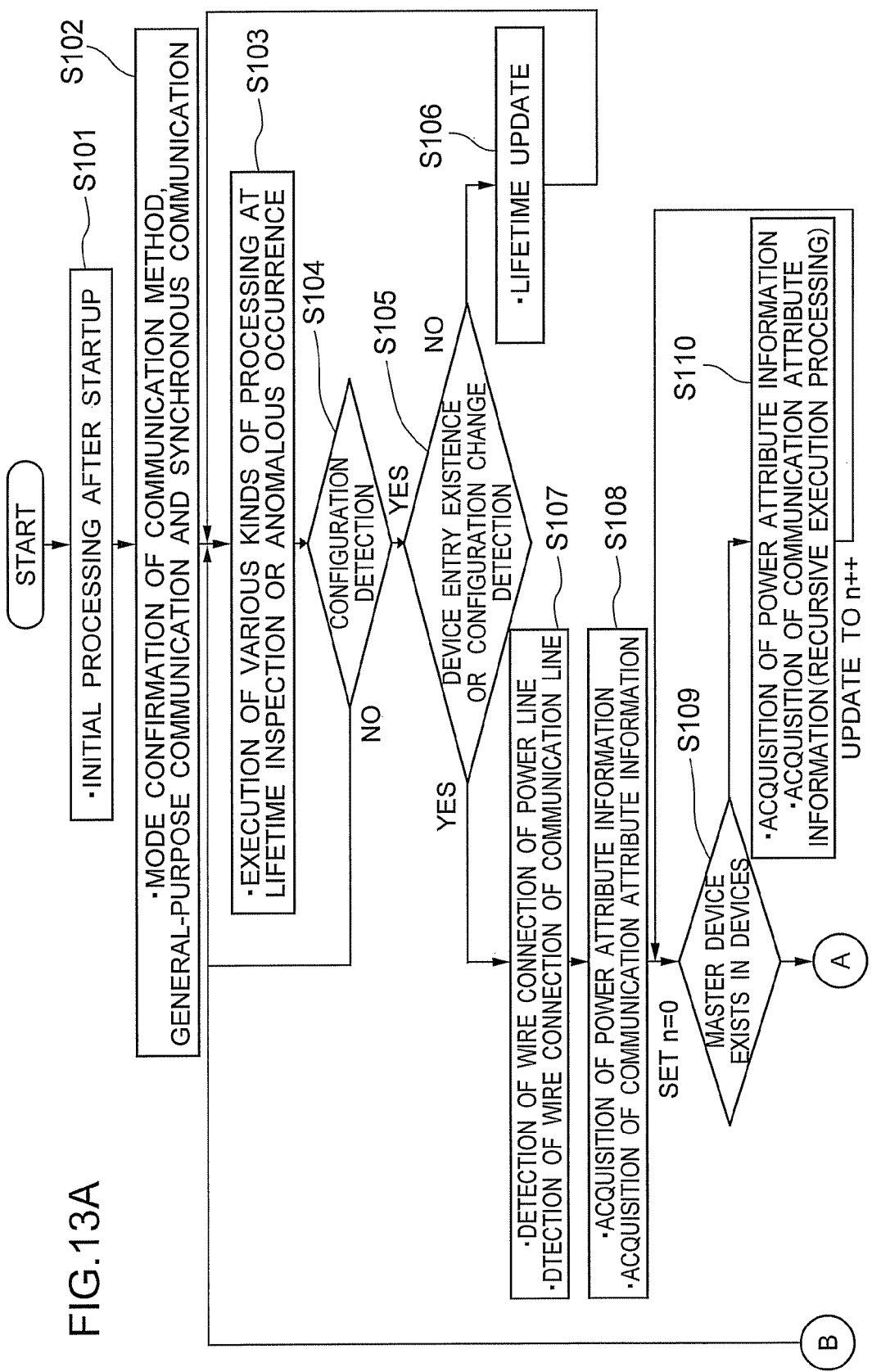

|  | POWER ALLOCATION CONTROL MASER = SYNCHRONIZATION INFORMATION TRANSMISSION DEVICE | POWER ALLOCATION CONTROL MASER ≠ SYNCHRONIZATION INFORMATION TRANSMISSION DEVICE |
|---|---|---|
| DISTRIBUTED COMMUNICATION PROCESSING | FIG. 15 | FIG. 16 |
| CENTRALIZED COMMUNICATION PROCESSING | FIG. 17 | FIG. 18 |

FIG.14

[CASE 1: POWER ALLOCATION
(DISTRIBUTED COMMUNICATION OR
CENTRALIZED COMMUNICATION)]

|  | POWER ELECTRONICS DEVICE① | POWER ELECTRONICS DEVICE② | POWER ELECTRONICS DEVICE③ |
|---|---|---|---|
| POWER ALLOCATION MASTER | INV(AC/DC): ENERGY BATTERY | INV(AC/DC): ENERGY BATTERY | INV(AC/DC): ENERGY BATTERY |
| PHASE SYNCHRONIZATION MASTER | — | — | — |

[CASE 2: PHASE SYNCHRONIZATION OF OUTPUT POWER
(DISTRIBUTED COMMUNICATION)]

|  | POWER ELECTRONICS DEVICE① | POWER ELECTRONICS DEVICE② | POWER ELECTRONICS DEVICE③ |
|---|---|---|---|
| POWER ALLOCATION MASTER | INV(AC/DC): ENERGY BATTERY | INV(AC/DC): ENERGY BATTERY | INV(AC/DC): ENERGY BATTERY |
| PHASE SYNCHRONIZATION MASTER | STORAGE NUMBER:1 | STORAGE NUMBER:2 | STORAGE NUMBER:1 |

[CASE 2: PHASE SYNCHRONIZATION OF OUTPUT POWER
(CENTRALIZED COMMUNICATION)]

|  | POWER ELECTRONICS DEVICE① | POWER ELECTRONICS DEVICE② | POWER ELECTRONICS DEVICE③ |
|---|---|---|---|
| POWER ALLOCATION MASTER | INV(AC/DC): ENERGY BATTERY | INV(AC/DC): ENERGY BATTERY | INV(AC/DC): ENERGY BATTERY |
| PHASE SYNCHRONIZATION MASTER | SLAVE | MASTER | SLAVE |

FIG.19B

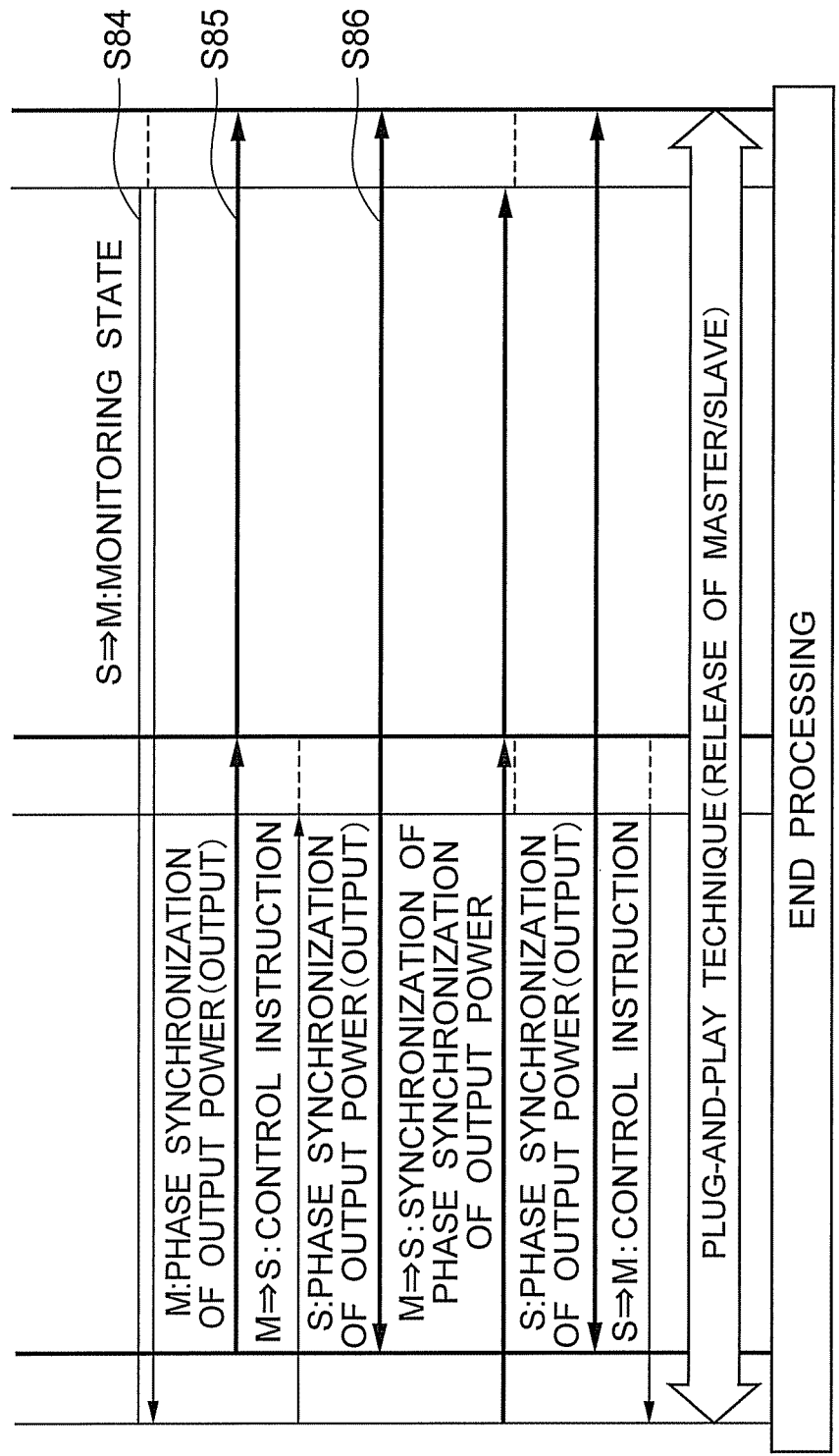

| HEADER PART | IDENTIFIER | ADVERTISEMENT TYPE | LOCATION LENGTH | LOCATION |

FIG.23

| HEADER PART | MAXIMUM WAIT TIME |

FIG.24

| HEADER PART | IDENTIFIER | LOCATION LENGTH | LOCATION |

FIG.25

| HEADER PART | IDENTIFIER | SEQUENCE NUMBER | RESULT |
|---|---|---|---|

FIG.27

| HEADER PART | IDENTIFIER | SEQUENCE NUMBER |
|---|---|---|

FIG.28

| HEADER PART | IDENTIFIER | SEQUENCE NUMBER |

FIG.30

| HEADER PART | IDENTIFIER | ALTERNATING-CURRENT FREQUENCY | PHASE ERROR |

FIG.33

| HEADER PART | IDENTIFIER | OPERATION STATE | ELECTRIC ENERGY | HEAT QUANTITY | TEMPERATURE DIFFERENCE | PRESSURE AMOUNT | FLOW RATE |
|---|---|---|---|---|---|---|---|

FIG.35

POWER ELECTRONICS DEVICE, COOPERATIVE CONTROL METHOD AND NON-TRANSITORY COMPUTER READABLE MEDIUM

CROSS REFERENCE TO RELATED APPLICATIONS

This application is based upon and claims the benefit of priority from the prior Japanese Patent Application No. 2013-180443 filed on Aug. 30, 2013, the entire contents of which are incorporated herein by reference.

FIELD

Embodiments relate to a power electronics device, a cooperative control method and non-transitory computer readable medium.

BACKGROUND

Take a moment to consider a system in which an inverter unit (i.e., power electronics device) that converts the power is provided with a communication function and autonomous cooperative control such as power source phasing and power allocation is applied between a plurality of power electronics devices to maintain the flexibility of operations while automatically implementing a capacity change even at the time of expansion and the time when an abnormality occurs.

In such a system, it is considered that a plurality of power electronics devices mount a function called "power allocation control" to dynamically distribute the power input/output within the electrical power handling capability. Moreover, it is considered to mount a function called "output power phase synchronization control" in an application to drive the power electronics devices in parallel to increase the output of power.

The output power phase synchronization control function is to prevent an occurrence of cross current (e.g. reactive current caused by a difference of electromotive force, synchronization cross current caused by a phase difference of electromotive force and harmonic cross current caused by a waveform difference of electromotive force) in an output on the alternating-current side. In this case, it is useful for the throughput increase in the power input/output to determine the subject of control between the power electronics devices, that is, to determine a master (i.e. device of a control subject) and a slave (i.e., device of a controlled subject) and give an instruction of power information and synchronization information (e.g., time synchronization information and frequency information) from the master to the slave for power source phasing. In a case where three or more power electronics devices are connected to the same power line, since it is difficult only with information on the power line to recognize individual actual values with respect to the planned values of respective devices, power information is exchanged using the communication control and the master synchronizes with the slave.

In the related art, there is disclosed a method that a plurality of inverters in which the master/slave roles are set in a fixed manner realize parallel operation corresponding to the phase synchronization of output power by the use of synchronization by an optical communication line. Moreover, there is disclosed a method of dynamically setting software of a server that monitors and controls a device by notifying device information to the server by the use of communication when the device is connected to a system.

In a case where the master/slave roles are dynamically decided between the power electronics devices, since each device individually operates at the time of initial installation or anomalous occurrence, if the correspondence of information on a logical configuration to control power (allocation control or phase control) between the devices is not considered, there may occur a state in which operation starts in a case where a plurality of masters exist in a system. In this case, since it is difficult to unify the determination as to from which power electronics device the synchronization information is to be received for operation, there is a problem that the function of phase synchronization of output power does not operate correctly. Moreover, if an actual installation state is not considered in the decision of the sending subject of the synchronization information for the phase synchronization of output power, there is a problem that it is not possible to realize the phase synchronization at high accuracy. Such problems cannot be solved in the related art.

As described above, the roles between power electronics devices are defined in a fixed manner in the related art, and there is not disclosed a method of dynamically performing logical configuration management and role decision of power allocation control and output power phase synchronization control at the time of initial device installation or anomalous occurrence after the start of operation, and increasing the throughput of power input/output while securing the flexibility of operation. Especially, at the time of cooperative operation of a plurality of power electronics devices, the role decision taking into account an actually installed system configuration is necessary.

BRIEF DESCRIPTION OF THE DRAWINGS

FIG. 11 is a configuration management information view of a power electronics device according to an embodiment;

FIG. 12 is a configuration management information view of a power electronics device according to an embodiment;

FIGS. 13A, 13B and 13C show an internal operation flowchart of configuration management of a power electronics device according to an embodiment;

FIG. 14 is a schematic view related to the phase synchronization of output power of a plurality of power electronics devices according to an embodiment;

FIGS. 19A and 19B show a schematic view related to the phase synchronization of output power of a plurality of power electronics devices according to an embodiment;

FIGS. 22A and 22B show a coordinated operation diagram of a power electronics device and a smart meter according to an embodiment;

FIG. 23 illustrates a communication message configuration message of advertisement according to an embodiment;

FIG. 24 illustrates a communication message configuration example of a search request according to an embodiment;

FIG. 25 illustrates a communication message configuration example of a search response according to an embodiment;

FIG. 27 illustrates a communication message configuration example of a configuration information write response according to an embodiment;

FIG. 28 illustrates a communication message configuration example of a configuration information read request according to an embodiment;

Figure 30:
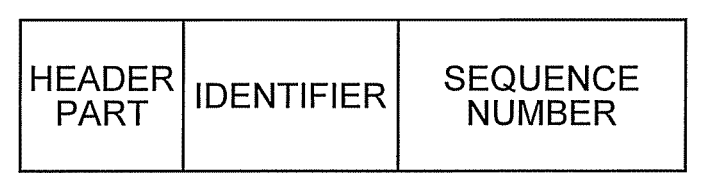

FIG. 30 illustrates a communication message configuration example of a power wire connection acknowledgement request according to an embodiment;

FIG. 33 illustrates a communication message of synchronous communication according to an embodiment;

FIG. 35 illustrates a communication message configuration example of a smart meter according to an embodiment.

DETAILED DESCRIPTION

According to one embodiment, there is provided a power electronics device including: a first connecting unit, a second connecting unit, a power converting unit, a communicating unit and a controlling unit.

The first connecting unit connects with a first power line of a plurality of power lines.

The second connecting unit connects with a second power line of the power lines.

The power converting unit converts power input from one of the first and second connecting units and output converted power to the other.

The communicating unit performs communication with power electronics devices different from the power electronics device.

The controlling unit acquires power attribute information and communication attribute information of the power electronics devices different from the power electronics device using the communicating unit.

The controlling unit selects a first power electronics device and a second power electronics device out of the power electronics device and the power electronics devices different from the power electronics device based on the acquired power attribute information, the acquired communication attribute information, power attribute information of the power converting unit and communication attribute information of the communicating unit.

The first power electronics device is a master of power allocation control of electric energy that the power electronics devices connected to one power line of the power lines perform input and output on the one power line. The second power electronics device is a master of output power phase synchronization control of power which the power electronics devices connected to the one power line outputs to the power line.

In embodiments, power electronics devices store "power attribute information" to decide the master/slave related to power allocation control, "communication attribute information" to decide the master/slave related to the synchronization of output power phase synchronization control and "configuration management information" to express the master-servant relationship of master/slave decided between devices, and, based on these items of information, implements dynamic autonomous cooperation control in a plurality of power electronics devices. As a result of this, it is possible to realize an increase in the power input/output throughput while securing the flexibility and the availability. In the following, details of embodiments are described.

Figure 1:
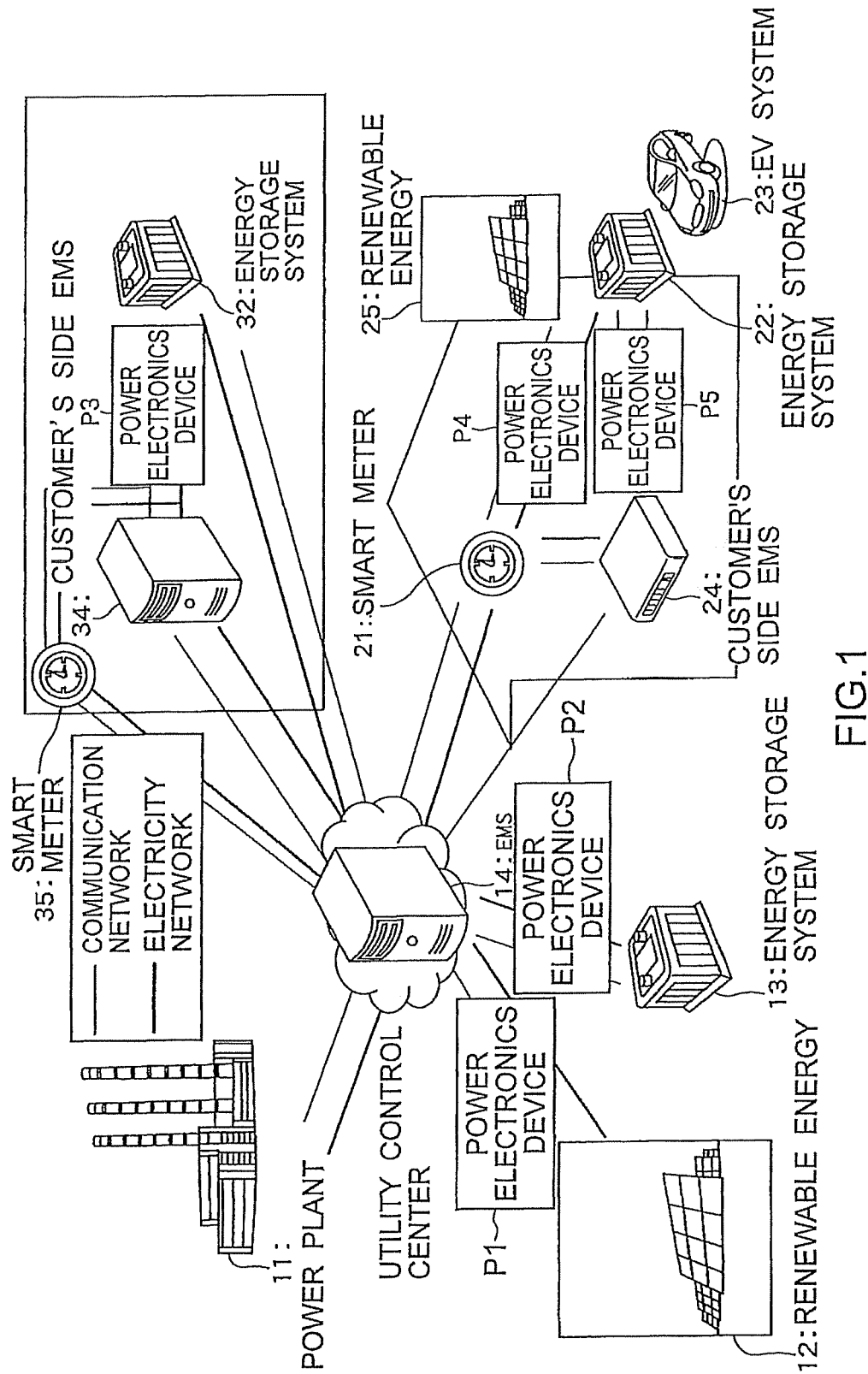
FIG. 1 is an overall system configuration view according to an embodiment.

A whole of system configuration in the present invention outline is presented in FIG. 1. Power station (utility control center) 11 and naturally occurring sources of energy 12, battery system 13, and EMS (Energy Management System) 14 (energy source that includes the solar photovoltaic system, the wind generator system, and the hydroelectric system, etc.) are set up on the power infrastructure side.

Moreover, on the customer side of a home or building, there are provided smart meters 21 and 35, energy storage systems 22 and 32, an EV (Electric Vehicle) system 23, customer's side EMS's 24 and 34. Moreover, a renewable energy source 25 such as PV (PhotoVoltaic) generation and wind power generation is installed. A customer's side EMS for homes implements power monitoring control in customers as an HEMS (Home Energy Management System), the customer's side EMS for buildings implements power monitoring control in the customers as a BEMS (Building Energy Management System) and the customer's side EMS for factories implements power monitoring control in the customers as an FEMS (Factory Energy Management System). Inverters (power electronics devices) P1, P4, P2, P5 and P3 that convert the I/O power (direct current/alternating current or direct current/direct current) are connected with renewable energy sources 12 and 25 and energy storage systems 13, 22 and 32.

The power plant (or utility control center) 11 generates a large amount of power by fuel sources such as fire power and nuclear power, and supplies it to the customer side such as homes, buildings and factories through transmission and distribution networks. In the present specification, the transmission and distribution networks from the power plant 11 to the customers are collectively referred to as "power infrastructure (or power system network)." The renewable energy source 12 includes a power generating device that generates power from energy existing in the natural world such as wind power and solar energy, and, in the same way as the power plant, supplies the power from the power system network to the customers through transmission and distribution networks. By installing the renewable energy source in the power system network, it is possible to reduce the burden in the power plant and efficiently perform an operation. Here, the energy storage system 13 has a role to store surplus power generated in the power plant 11 and the renewable energy source 12. Also, the EMS 14 has a role to control the stabilization in the whole power system including the supply power of the power plant 11 and the renewable energy source 12 and load power consumed on the customer side, using both an electricity network and a communication network.

The smart meters 21 and 35 measure the electric energy consumed in equipment on the customer side and periodically notifies it to a management server of an electric power provider. Generally, although the management server is referred to as "MDMS (Metering Data Management System)," its illustration is omitted in FIG. 1. The above-mentioned EMS 14 can calculate the total amount of load power on the customer side in cooperation with the MDMS. The energy storage systems 32 and 22 installed in customer's equipment store power supplied from the system network of the electric power provider or power generated by the renewable energy source in the equipment. The EV system 23 stores power in an in-vehicle battery through a battery charger. The HEMS performs supervisory control of the power consumption amount in the home and the BEMS performs supervisory control of the power consumption amount in the building or factory. As described above, embodiments are applicable to not only the home but also the building or factory in the same way. In this case, the BEMS in the building equipment and the customer's side EMS called "FEMS (Factory Management System)" in the factory play a role of performing supervisory control of the power consumption amount in the equipment.

As the use of the energy storage system on the system side of the electric power provider, an energy storage system is utilized to realize a function called "ancillary service" (i.e. short-period control) that stabilizes a system by performing output adjustment on the second time scale according to instant load changes in order to maintain the system frequency or the quality of power such as voltage. Also, as the use of the energy storage system on the home or building customer side, it may be utilized to realize a function called "peak shift" (i.e. day operation) that stores nighttime power of a lower unit price to implement interchange in a time period in which the diurnal power use is peak. Power electronics devices P1 to P5 convert power between the direct-current power input/output by an energy storage system or renewable energy source and the alternating-current power of the power system network.

Figure 2:
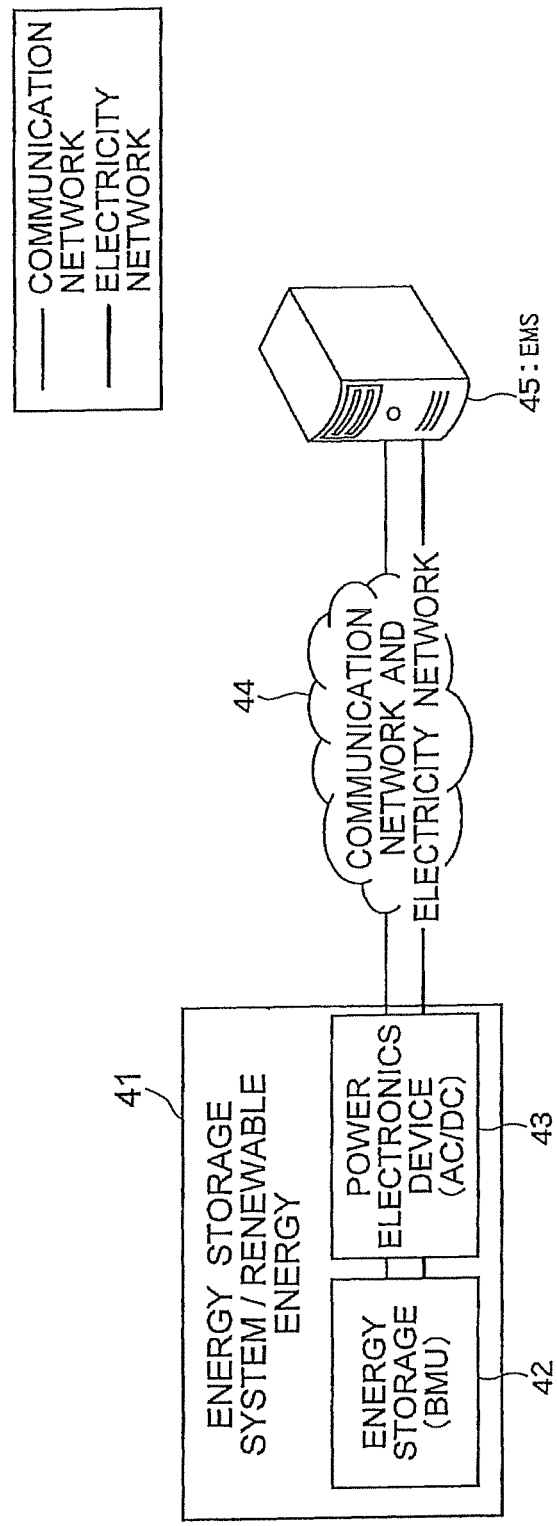
FIG. 2 is a system configuration view of an energy storage system or renewable energy according to an embodiment.
Figure 3:
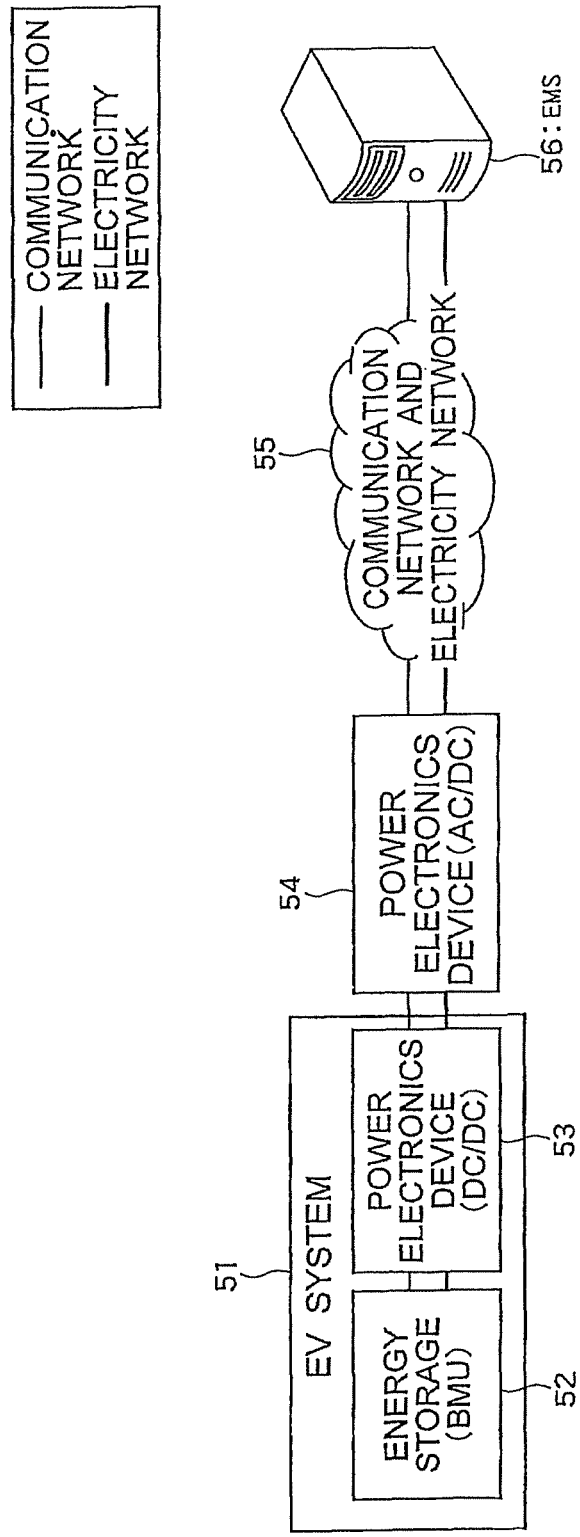
FIG. 3 is an EV system configuration view according to an embodiment.

FIG. 2 and FIG. 3 illustrate basic system configurations of the power electronics device in FIG. 1 according to an embodiment. These are details of the system configuration in FIG. 1. FIG. 2 presents a detailed configuration of the energy storage system and renewable energy system, and FIG. 3 presents a derailed configuration of the EV system. There is a feature that an energy storage in the energy storage system performs both charging and discharging, and a power generating device (corresponding to an energy storage battery management unit (BMU) portion) of renewable energy such as wind power and photovoltaic generation can implement only discharging.

The energy storage system/renewable energy source in FIG. 2 is connected to an EMS 45 through a communication network and electricity network 44. The EMS 45 may be an EMS on the system side or an EMS on the customer side. The energy storage system/renewable energy source is formed with an energy storage (BMU: Battery Management unit) 42 or a power generating device and a power electronics device 43. The power electronics device 43 is called "inverter," "converter" or "PCS (Power Conditioning System)" and therefore has a role to convert an input/output of power and adjust the voltage amount.

The energy storage (BMU) 42 includes a plurality of battery cells and an internal processor to manage the state inside a battery pack, and implements charge/discharge control of power based on a request from the power electronics device 43. The energy storage (BMU) 42 notifies information such as the rated voltage, the maximum current value at the time of discharge and charge, the SOC (State Of Charge) and the SOH (State Of Health) to the controlling unit.

In the example of FIG. 2, the power electronics device 43 exchanges direct-current power with the energy storage 42 and alternating-current power with the power system network 44. Although the power electronics device 43 performs direct-current/alternating-current conversion and voltage change suppression, it is considered that these functions are realized on a processor connected to the outside of the device.

Moreover, regarding the charge/discharge control and information notification between the energy storage (BMU) 42 and the power electronics device 43, in addition to a method of realizing them using a CAN (Controller Area Network), there is a possible method of realizing them using a wire communication medium such as Ethernet or a wireless communication medium such as a wireless LAN (Local Area Network), and, furthermore, an electrical signal line that is uniquely defined by a vendor who sells products. However, embodiments are not limited to any communicating units.

The power electronics device 43 in the energy storage system in FIG. 2 has a communication function and communicates with each EMS 45 installed in the power system network or the customer's equipment. Generally, since an energy storage has a feature of self-discharge, by acquiring information such as SOC and SOH from the energy storage system, the EMS 45 can adequately monitor the state that changes over time and instruct charge/discharge control.

Here, an input/output of power through the power electronics device may be referred to as "discharge and charge." Moreover, in a case where a power generating device of renewable energy such as wind power and photovoltaic generation is applied instead of the energy storage (BMU) 42, since the power electronics device basically performs only power output, in the use application in this case, the power output through the power electronics device may be referred to as "power output." In a power system formed with a plurality of power electronics devices, the power electronics devices play a role to switch the flow volume of input/output of power. This is described in detail in FIG. 4.

Although the EV system in FIG. 3 employs a configuration similar to the energy storage system/renewable energy in FIG. 2, they are different in that a power electronics device 54 operating as a battery charger exists in addition to a power electronics device 53 that is connected to the energy storage 52 and operates. The EV system 51 is connected to each EMS 56 through a communication network and electricity network 55.

The power electronics device 53 connected to the energy storage 52 in the EV system 51 in FIG. 3 relays power and communication information between the energy storage (BMU) 52 and the power electronics device (i.e. battery charger) 54. In this case, the power electronics device 53 does not necessarily have to have a communication capability to communicate with each EMS 56 on the power system network or in customer's equipment. That is, in the example of FIG. 3, there is a difference that an alternating-current/direct-current conversion function in the power electronics device in the energy storage system in FIG. 2 is shifted to the battery charger side corresponding to the power electronics device 54. In the configuration in FIG. 3, the power electronics device 53 implements direct-current/direct-current conversion and the power electronics device 54 implements direct-current/alternating-current conversion.

However, a specific procedure to realize an embodiment is common in both FIG. 2 and FIG. 3, and, furthermore, the role of the EV system can be defined to the same role as the energy storage system. Further, although there are a plurality of formats that: algorithm control related to discharge and charge with respect to the energy storage (BMU) 52 is integrated into the power electronics device 53; the algorithm control is integrated into the power electronics device (i.e. battery charger) 54; and the algorithm control is integrated into HEMS/BEMS in customer's equipment or EMS in the power system, the embodiment can be realized in the same framework even if any format is used.

Figure 4:
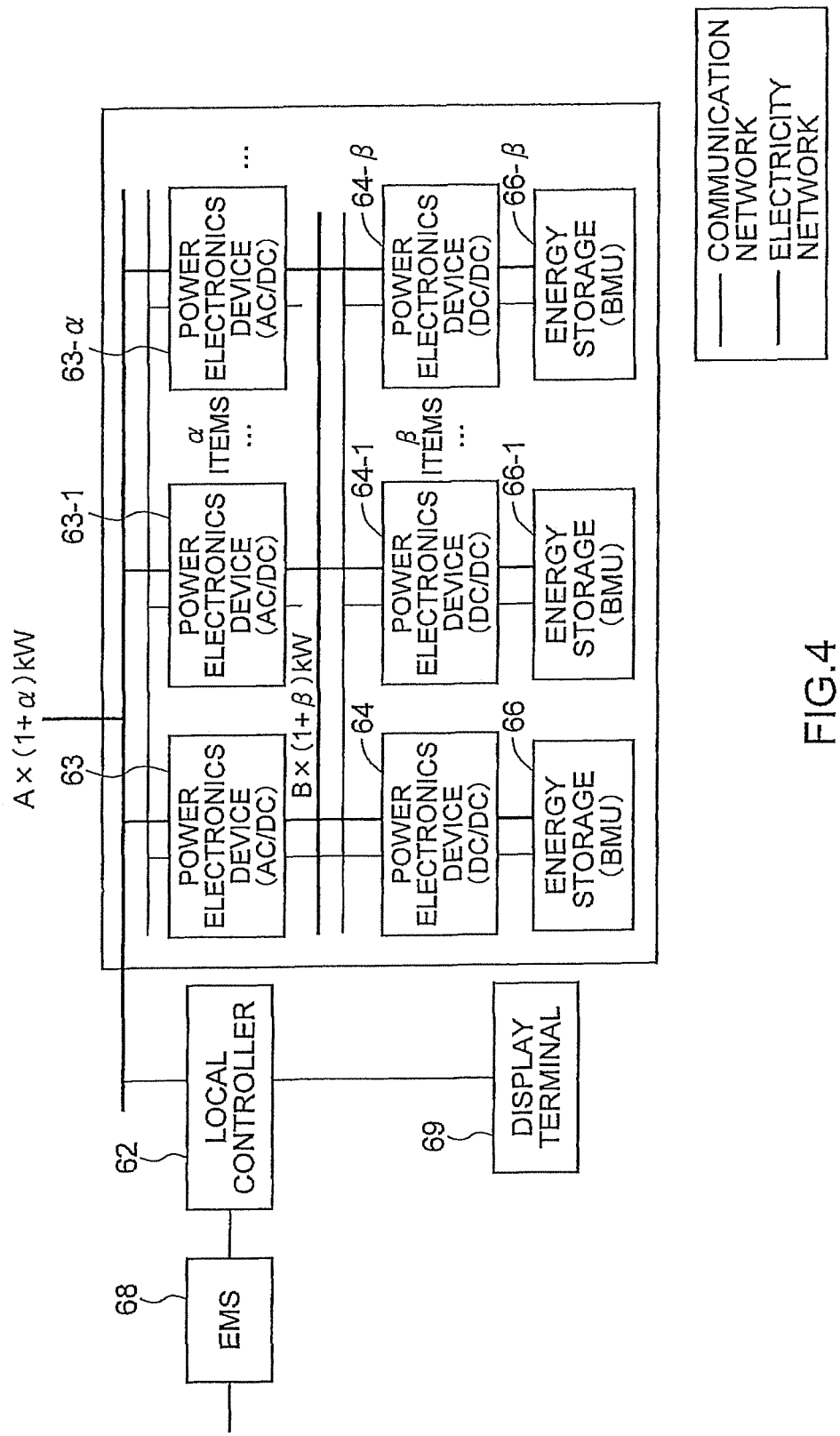
FIG. 4 is a system configuration view of a plurality of power electronics devices according to an embodiment.

In addition to the examples of FIG. 2 and FIG. 3, the power electronics device according to the embodiment can also be applied to a configuration in which a plurality of power electronics devices are combined as illustrated in FIG. 4. For example, in a case where a plurality of storage batteries (and/or a power generating device of renewable energy) are combined to form a logical set of power units, the set includes one or a plurality of local controllers, power electronics devices (AC/DC, DC/DC), and storage batteries (and/or power generating device), and so on. In the example illustrated in the figure, a power system serving as the identical aggregate includes power electronics devices (AC/DC) 63 and 63-1 to 63-α, power electronics devices (DC/DC) 64 and 64-1-64-β and storage batteries 66 and 66-1-66-β, where they are connected through an electricity network and a communication network. The power electronics devices (AC/DC) 63 and 63-1-63-α are connected with a local controller 62 through the communication network, and the local controller 62 is further connected with an EMS 68 and a display terminal 69.

In this case, the space between an outside EMS 68 or the local controller 62 (the local controller itself can be omitted) and the power electronics device corresponds to the example of FIG. 2 or FIG. 3, and it is possible to realize a power application such as control of active power/reactive power. In addition to this, in a case where a plurality of power electronics devices perform an operation together, when a plurality of power electronics devices are driven in parallel, it is possible to intend the output increase of power.

In the example of FIG. 4, when it is assumed that the rating of the input/output power of each power electronics device (AC/DC) connected to the alternating current side is A kW (kilo watt), by driving 1+α items in parallel, it is possible to increase the output to A×(1+α) kW and realize a power application function called "power allocation control" or "output power phase synchronization control". The power allocation is realized by dynamically distributing the input/output electric energy in the electrical power handling capability.

The output power phase synchronization control is realized by preventing an occurrence of cross current (e.g. reactive current caused by a difference of electromotive force, synchronization cross current caused by a phase difference of electromotive force and harmonic cross current caused by a waveform difference of electromotive force) in an output on the alternating-current side. To this end, however, there is a problem of failure to find correct synchronization unless a control subject to identify a synchronization source device of parallel driving is correctly decided (i.e. master-slave determination) between a plurality of power electronics devices operating in parallel.

To be more specific, there is a feature that, for example, in the case of connection to a high power signal such as the power system network, a power electronics device does not especially have to exchange information for synchronization via the communication network and gradually synchronizes with a signal of the electricity network by electrical characteristics. However, like the case of power outage, a problem in a case where the scale of input/output electric energy is substantially constant and a plurality of items operate at the same time is that, unless information of a place for synchronization is exchanged via the communication network, a power input/output intended by the user of the power electronics device is not performed.

When three or more power electronics devices are connected, since it is difficult only by information on the power line to recognize individual actual values with respect to the planned values of respective devices, it is essential to synchronize with the master by the use of information on the communication line. Meanwhile, since the input and output power is direct current, a power electronics device (DC/DC) connected to the direct current side does not find synchronization like power source phasing. However, in a case where a power application function such as the power increase and the power allocation is realized by a plurality of devices, similar to output power phase synchronization control, the allocation amount is selected (e.g., an energy storage to be charged or discharged is selected) after a control subject is determined (i.e., master-slave determination). By connecting a display terminal 69 to a power electronics device or a local controller through the communication network, it is possible to realize a power application for a data monitor, abnormal notification or parameter adjustment.

Also, as described above, on the power system network side, to respond to an instantaneous load change, each energy storage generally has a system corresponding to a function called "ancillary service." In this case, since it is necessary to secure a large storage capacity equal to a power plant, as illustrated in FIG. 4, it is effective to install a set of energy storage/renewable energy power generating devices connected to a power electronics device.

Even on the customer side, it is a common practice to provide a function called "peak shift" to store nighttime power of a lower unit price to implement interchange in a time period in which the diurnal power use is peak. Under a condition to give a certain incentive to the customer side, it is an activation format that an electric power provider uses the storage batteries installed on the customer side or power of renewable energy.

Thus, depending on various utilization forms, since a plurality of control subjects and a plurality of controlled subjects may be provided, it is necessary to apply a master-slave determination procedure and avoid the conflict of supervisory control.

FIG. 5A, FIG. 5B, FIG. 5C and FIG. 5D present four kinds of power application functions focusing on the use of a plurality of power electronics devices in an embodiment.

Figure 5A:
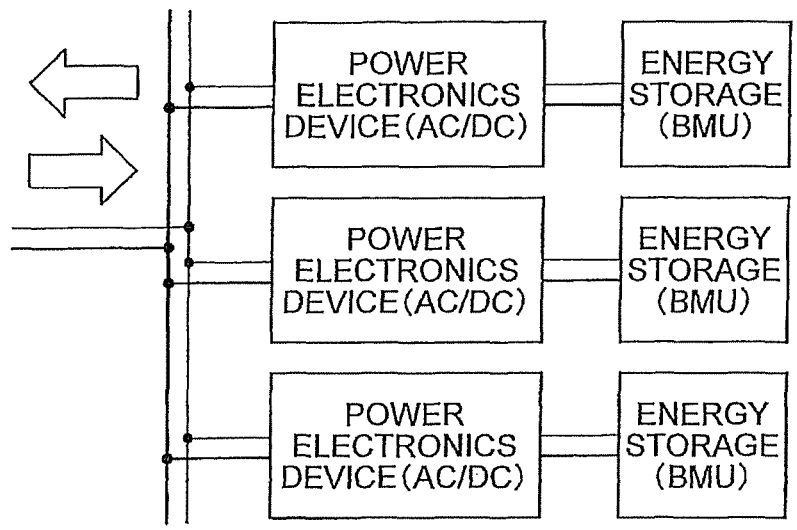
FIGS. 5A to 5D are system configuration views of a plurality of power electronics devices according to an embodiment.
Figure 5B:
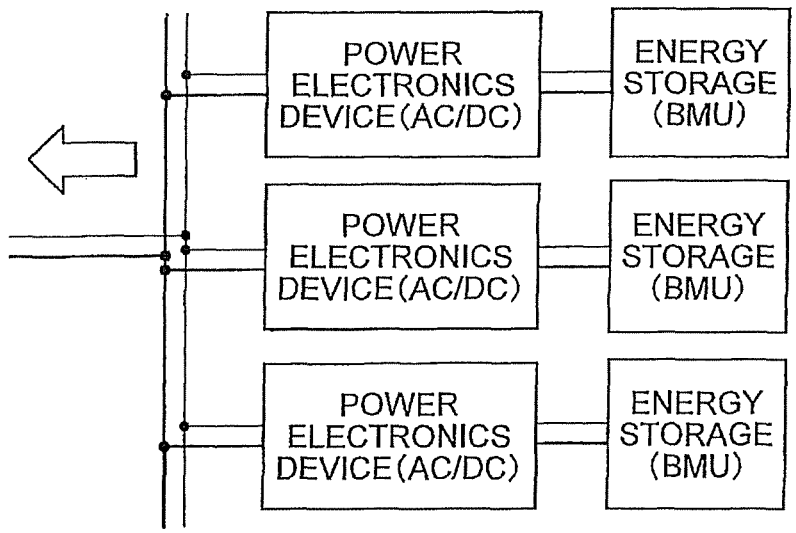
Figure 5C:
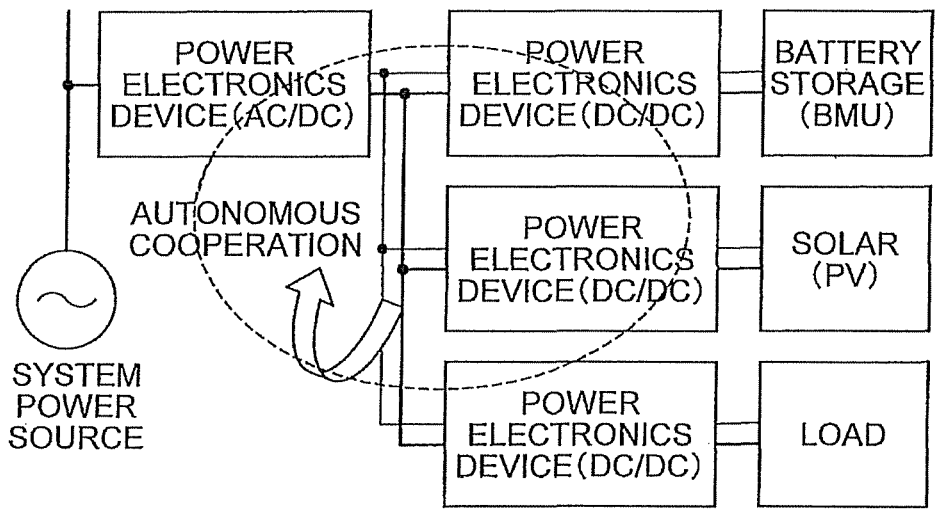
Figure 5D:
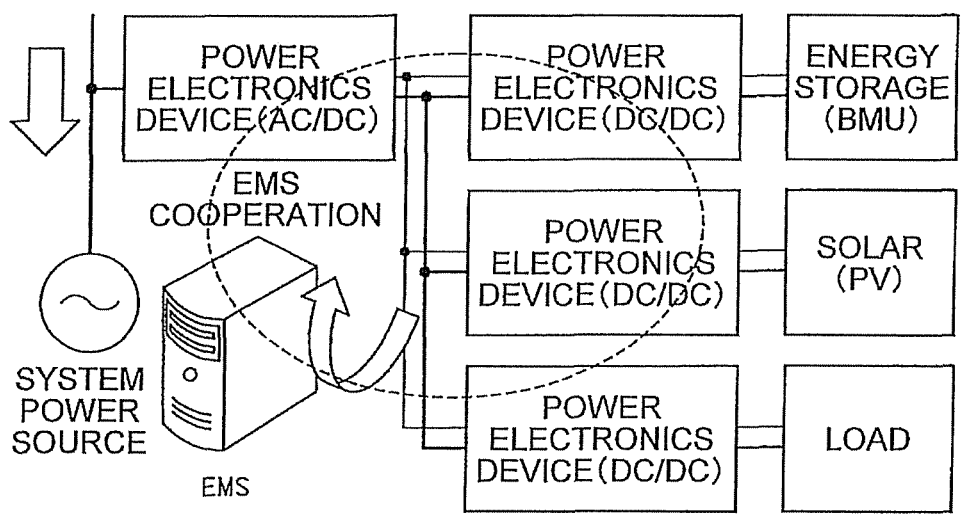

FIG. 5A, illustrates "autonomous cooperation: power allocation in the electrical power handling capability", FIG. 5B illustrates "autonomous cooperation: synchronization operation of a plurality of power sources (phase synchronization of output power)", FIG. 5C illustrates "autonomous cooperation: self-operation at the time of blackout" and FIG. 5D illustrates "EMS cooperation: supervisory control of active power/reactive power." These are provided by revising the configuration view in FIG. 4 from a viewpoint of the application function and a viewpoint of the installation configuration.

As illustrated in FIG. 5A, power allocation control is applied in a case where a plurality of power electronics devices (AC/DC) connected with the power source or the load input/output power to the direct current side or the alternating current side. Further, the power allocation control is applied even in a case where a plurality of power electronics devices (DC/DC) connected only to the direct current side and also connected with the power source perform power output (see FIG. 4). In the example of FIG. 5A, since each power electronics device is connected with the electric power system and the power system normally functions, the output power phase synchronization control is not necessary. In this case, the master of the output power phase synchronization control is not necessary and it only has to decide only the master of the power allocation control.

Meanwhile, FIG. 5B illustrates a case where the output power phase synchronization control is performed in addition to the power allocation control when a plurality of power electronics devices (AC/DC) connected with the power source output the alternating-current power in parallel to the alternating-current system. In this example, a case is assumed where the power system illustrated in the figure is operated in a factory when the electric power system becomes blackout. In this case, when the master of the power allocation control and the master of the output power phase synchronization control are decided, it is necessary to prevent the generation of cross current by matching the output waveforms of the power electronics devices.

Meanwhile, as illustrated in FIG. 5C and FIG. 5D, a configuration in which a plurality of power electronics devices are connected in a layered manner is possible. A plurality of power electronics devices (DC/DC) are bundled and connected with an electricity electronics device (AC/DC). The power electronics device (AC/DC) is connected with the power system (system power source). Here, there are a case where the power electronics devices perform exchange without using an EMS and perform autonomous cooperation operation like FIG. 5C and a case where the supervisory control of centralized control using the EMS is performed like FIG. 5D. In an embodiment, a configuration without using the EMS like examples of FIG. 5A, FIG. 5B and FIG. 5C is defined as autonomous-cooperation supervisory control.

Figure 6:
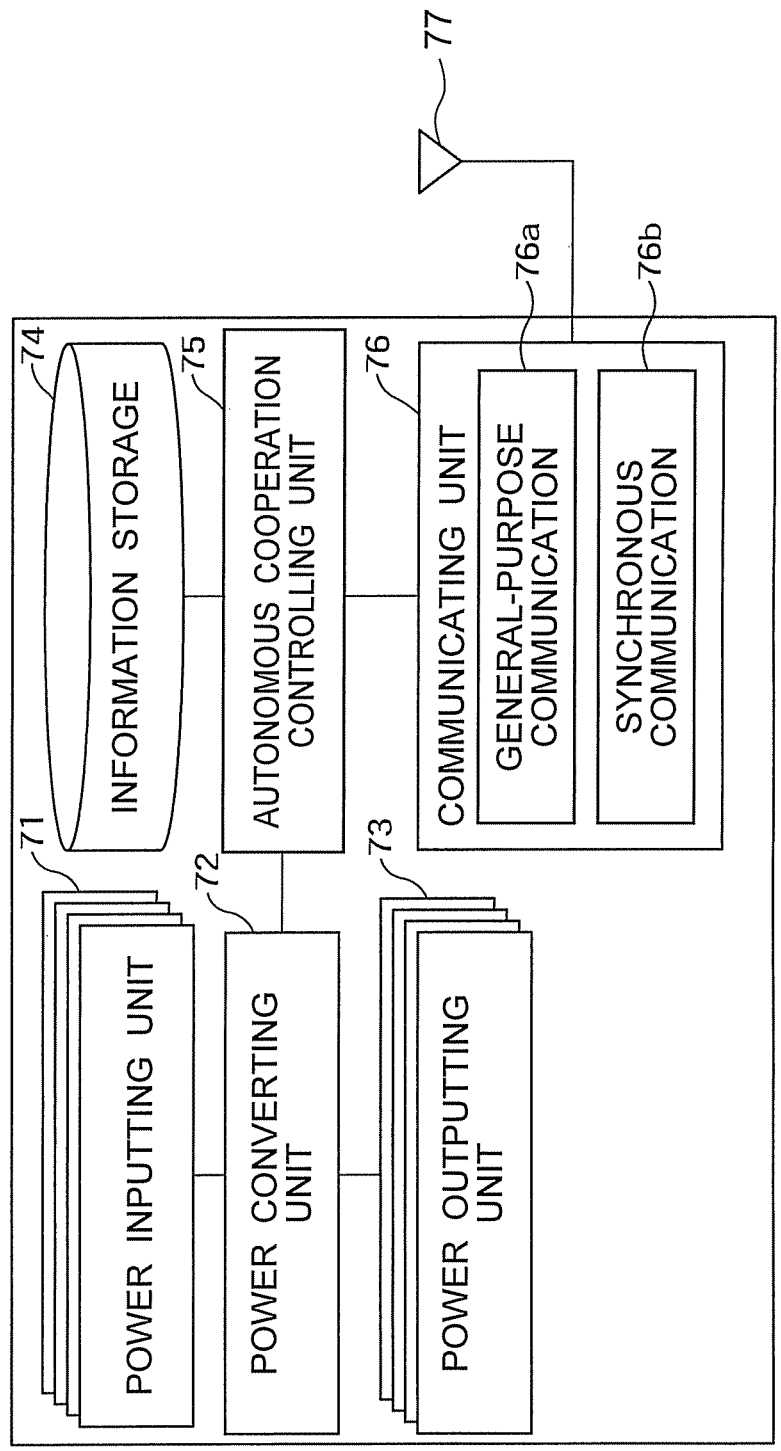
FIG. 6 is a configuration view of a power electronics device according to an embodiment.

FIG. 6 presents a configuration example of a power electronics device according to an embodiment. As described above, the power electronics device corresponds to a power electronics device connected with the energy storage battery management unit (BMU) or power generating device in the energy storage system/renewable energy system in FIG. 2. Alternatively, it corresponds to the power electronics device 53 connected to the energy storage (BMU) in the EV system in FIG. 3 or the power electronics device 54 connected to a battery charger. Besides this, it similarly corresponds to each power electronics device in FIG. 4 and FIG. 5.

The power electronics device in FIG. 6 includes a power inputting unit 71, a power converting unit 72, a power outputting unit 73, an information storage 74, an autonomous cooperation controlling unit 75, a communicating unit 76 and an antenna 77. The communicating unit 76 includes a general-purpose communication unit 76a and a synchronous communication unit 76b. Although the communicating unit 76 adopts a configuration to perform wireless communication using the antenna 77 in the illustrated example, the general-purpose communication unit 76a and the synchronous communication unit 76b may adopt a configuration to perform wire communication by a copper line or the like without wireless communication. Especially, the synchronous communication unit 76b may adopt a configuration to perform optical communication by an optical fiber or the like. The general-purpose communication unit 76a and the synchronous communication unit 76b may be configured as one functional communication unit without being separated. Part or all of the components of FIG. 6 are not limited to the application on the power electronics device, and can be similarly applied to an EMS or local controller and implemented.

Specifically, the power inputting unit 71, the power converting unit 72 and the power outputting unit 73 play roles of direct-current/alternating-current, direct-current/direct-current or alternating-current/alternating-current power conversion, frequency monitoring and adjustment of power and change detection and adjustment of voltage. In addition to a configuration in which there are a plurality of power inputting units 71 and a plurality of power outputting units 73, a configuration is possible in which the number of each of them may be one. In actual implementation, there is a case where the power electronics device causes the power inputting unit 71 to input power from an energy storage (BMU) or power generating device of renewable energy, and there is a case where the power electronics device causes the power inputting unit 71 to input power from a power system network. Moreover, the power input from the power inputting unit 71 is subjected to direct-current/alternating-current, direct-current/direct-current or alternating-current/alternating-current power conversion and is subsequently output from the power outputting unit 73, but, in addition to a configuration in which the power inputting unit 71 and the power outputting unit 73 are prepared as physically different power circuits, there is a form in which they are commonly prepared in physically the same circuit. An embodiment does not depend on a specific form.

Moreover, in an embodiment, the electric energy at the time of power input/output (charge/discharge) of the energy storage battery management unit (BMU) or power generating device can be expressed as the current expressed in Ah (Ampere hour), the voltage expressed in Vh (Volt hour) or instantaneous electric energy W in addition to the electric energy expressed in Wh (Watt hour).

An information storage 74 generally stores three kinds of information of power attribute information, communication attribute information and configuration management information. The power attribute information is information used at the time of deciding the master/slave of power allocation control. The communication attribute information is information used at the time of deciding the master/slave (the source of phase synchronization, and so on) of output power phase synchronization control. The configuration management information is information to express the master-servant relationship of master/slave decided between devices. Information stored in the storage is not limited to these three kinds.

FIG. 11 and FIG. 12 illustrate an example of the configuration management information. FIG. 11 illustrates configuration management information for each device and FIG. 12 illustrates configuration management information in the entire system. Each device stores the configuration management information in FIG. 11 and FIG. 12. It is information in which all items are fixed at the time of performing master-slave determination processing and which can be updated at any time according to the situation afterwards.

As presented in FIG. 11, the configuration management information is formed with a plurality of items of information such as "unit number", "unit type", "communication wire connection", "power wire connection", "power allocation control master/slave" and "output power phase synchronization control master/slave".

The unit number denotes information to show the unique code (such as the production number) of each device. In association with this information, it is possible to manage the value of an electrical signal applied/detected with respect to a power line when the power electronics device understands the power wire connection.

The unit type expresses the power attribute of a device that exists in a system such as an EMS, a local controller and a power electronics device, and is classified into the EMS, INV (AC/DC): energy storage, INV (AC/DC): solar energy, INV (AC/DC), INV (DC/DC): energy storage, INV (DC/DC): solar energy, INV (DC/DC) and a smart meter. As described later, these are arranged in order of priority of the power allocation control master. The unit type corresponds to power attribute information that is information used at the time of deciding the master/slave of power allocation control.

INV (AC/DC) is synonymous with a power electronics device that performs conversion between the alternating current and the direct current, that is, a power electronics device (AC/DC). INV (DC/DC) is synonymous with a power electronics device that performs conversion between direct currents, that is, a power electronics device (DC/DC). INV (AC/DC): energy storage is synonymous with a power electronics device (AC/DC) connected with an energy storage, and INV (AC/DC): solar energy is synonymous with a power electronics device (AC/DC) connected with a solar power generation device. INV (DC/DC): energy storage is synonymous with a power electronics device (DC/DC) connected with the energy storage, and INV (DC/DC): solar energy is synonymous with a power electronics device (DC/DC) connected with the solar power generation device.

Thus, the unit type contains not only information on the power conversion function of a power electronics device but also information to determine information as to whether an energy storage or a power generating device is connected with the power electronics device. Although it is considered that such information is acquired using a communication unit such as Ethernet, CAN and RS-232/RS-485 when the power source or the load is connected with the power electronics device, a case is considered where it is fixed and set at the time of shipping.

"Communication wire connection" denotes information on a device (devices) on the same communication broadcast domain, and "power wire connection" denotes information on a device (devices) on the same bus line.

"Power allocation control master/slave" denotes identification information on the master (a device as a control subject) and slave (a device as a controlled subject) related to power allocation control.

"Output power phase synchronization control master/slave" denotes identification information on the master (a device as a control subject) and slave (a device as a controlled subject) related to output power phase synchronization control.

Here, as for the setting of information on "power wire connection", there are several following possibilities:
  "manual input and confirmation by the use of a display terminal by a worker"
  "automatic recognition method between power electronics devices (as for an output of a specific electrical signal, check of behavior on a power line while performing communication)"
  "middle between automatic recognition and manual input (for example, recognition that power electronics devices that shift to a specific state by specific operation by a worker in the same time interval are located on the same bus line)"

An embodiment does not depend on a specific method.

When the automatic processing of detecting the power wire connection information is described in more detail, the extent to which it can be automatically realized without using operator's hands at the time of checking the wire connection relationship in the power aspect or communication aspect depends on the investment standard or the system configuration.

For example, as a system configuration, in a case where power electronics devices are arranged in parallel on the power line of the alternating-current system and the alternating-current system is a power system, it is always in a conduction state except for malfunction such as the blackout. From this, to check the wire connection in the power aspect, instead of a method in which the power electronics devices apply an electrical signal to the power line, in a case where information on the voltage/frequency or the like read out from the alternating-current side is mutually exchanged by communication control and each of the read values is within a predetermined threshold, it is possible to determine that they are on the same power bus line.

Meanwhile, in the case of a system configuration in which devices are arranged in a tree fashion from the alternating-current system to the direct-current system, since an internal direct-current system is not energized until the start of normal operation, in a case where power electronics devices mutually apply an electrical signal to the power line and detect a predetermined signal from the power line, it is possible to determine that they are on the same power bus line.

Moreover, in a case where it is difficult to replace all worker's procedures with automatic processing, application is considered in which the result of partial automatic processing is presented as reconfirmation of the operation procedures after confirmation is manually performed. The manual confirmation described above means a method in which the worker confirms individual connection relationships by the individual use of visual contact or design and inputs them in the power electronics devices.

Here, a determination method of the master/slave of power allocation control is described. The master/slave of the power allocation control is decided on the basis of the priority depending on the unit type.

The unit type that is power attribute information is mutually communicated between power electronics devices, and the one with connection to the alternating-current system and the one housing the power source system of an energy storage/solar energy are prioritized. For example, the decision criteria are weighted such that the priority is higher in order from EMS>>INV (AC/DC): energy storage>>INV (AC/DC): solar energy>>INV (AC/DC)>>INV (DC/DC): energy storage>>INV (DC/DC): solar energy>>INV (DC/DC)>>smart meter. The priority of the one with connection to the alternating-current system and the one housing the power source system in the master/slave determination can be rearranged. INV (AC/DC) indicates a power electronics device which performs alternating-current-to-direct-current conversion and with which other loads than batteries or solar power generation devices or other power electronics devices are connected. INV (DC/DC) indicates a power electronics device which performs direct-current-to-direct-current conversion and with which other loads than batteries or solar power generation devices are connected. The smart meter does not have to necessarily include all content of a communication message applied in an embodiment in communication wire connection or power wire connection or the like, the device itself is the smart meter and thereby can apply the mechanism of plug-and-play similarly.

At the time of startup for the first time, each device understands its own system type (for example, determines its own type from information of a power source or load connected with a power electronics device), and reflects it to the decision criterion of the master/slave of power allocation control. In a case where the unit types that are power attribute information are the same, it is considered that the communication attribute information is reflected to the decision criterion of the master of the power allocation control.

As the communication attribute information in an embodiment, at least one of information on the configuration of communication control in a system such as distributed communication processing and centralized communication processing, information on the classification of general-purpose communication and synchronous communication, information on other devices connected by communication and information on the role (a base station or a slave station in centralized control) in communication control is considered. Moreover, in the role, the reception signal intensity at the time of communication with other devices and the number of connections (storage number) with other devices are considered.

Moreover, in a case where the above-mentioned priority is not applied, the master and the slave are decided on the basis of standards such as "device activated earlier", "device activated later", "pre-configuration" and "random".

Although there are many cases where an EMS and a local controller or the like generally mount a plurality of functions and are therefore realized by a general-purpose calculator that can execute various kinds of algorithm processing, it is also considered that individual information on power electronics devices with a wire connection relationship is managed and identification information assignment as the entire system or collective control is dynamically performed.

As for targets housed by a power electronics device, the reason for further providing the classification of priority for a power source or load such as an energy storage and solar energy is to select the energy storage, which can store necessary power before abnormality such as the blackout occurs, as a master at high priority, taking into account the system controllability at the time of anomalous occurrence, for example.

As illustrated in FIG. 12, configuration management information in the entire system includes items of the unit number, the unit type, the communication wire connection, the power wire connection and the master/slave. It is shown in a table format in this example. "Communication wire connection" shows the list of the unit numbers of other power electronics devices with the communication wire connection relationship. "Power wire connection" shows the list of the unit numbers of other power electronics devices with the power wire connection relationship. "Master/slave" shows the list of the unit numbers of other power electronics devices that are the master/slave of power allocation control. For example, a power electronics device of unit number 1 is a power electronics device (INV (AC/DC)) that performs power conversion between the alternating current and the direct current, can perform communication with power electronics devices 2 and 3 and is connected with the same power line as the power electronics devices 2 and 3, where the power electronics devices 2 and 3 are slaves (the power electronics device 1 is the master of power allocation control) of the power allocation control of the power electronics device 1.

In the example of FIG. 2, although master/slave information of output power phase synchronization control is omitted, this information may be further added. Moreover, information on the EMS or the local controller other than power electronics devices may be further added. When there are a plurality of masters, since there is a possibility that a plurality of control instructions are given at the same time, it is preferable that the number of masters is one in the point of exclusive control.

Here, in power electronics devices, it may be considered that physical device components are divided for each power conversion function or the functions are shared in one power electronics device. For example, in a case where the power conversion functions are shared in one power electronics device, the power electronics device can perform both alternating-current/direct-current (AC/DC) conversion processing and direct-current/direct-current (DC/DC) conversion processing. At this time, as for expression of power characteristic information, in addition to a method of describing all possible power conversion functions, there is a possible method of using a role in the system that is actually operated.

For example, even if the power electronics device can perform both the alternating-current/direct-current (AC/DC) conversion processing and the direct-current/direct-current (DC/DC) conversion processing, in a case where it is detected that it is connected on the alternating-current power line in an actual system, it serves as a power electronics device (AC/DC).

To be more specific, there is a possible method of deciding the device type as the power electronics device (AC/DC) or the power electronics device (DC/DC) by connecting to the power line to consider the role of input/output of power. In the case of connection with at least one or more bus lines of the alternating-current system and connection with at least one or more bus lines of the direct-current system, the device type of the power electronics device can be decided as alternating-current-to-direct-current (AC/DC). In the case of connection with any one kind of bus line, it decides as alternating-current-to-alternating-current (AC/AC) or direct-current-to-direct-current (DC/DC).

The communicating unit 76 in FIG. 6 transmits and receives a communication message related to configuration detection/configuration analysis/configuration decision concerning power control (allocation control or output power phase synchronization control), a communication message related to supervisory control at the time of normal operation/self-operation, and a communication message related to supervisory control information after the start of operation such as normal operation and self-operation. The other party of transmission and reception is the EMS, the local controller or another power electronics device. The communicating unit 76 includes the general-purpose communication unit 76a to transmit and receive various communication messages, and the synchronous communication unit 76b specialized in transmission and reception of synchronization information. That is, the communicating unit performs communication processing for synchronization of phase synchronization of output power in addition to processing to transmit and receive a general-purpose communication message. It is possible to apply a format in which these functions are realized integrally, in addition to a format in which they are realized respectively. Naturally, an embodiment does not depend on a specific form. Here, the communication control described in the embodiment indicates both general-purpose communication and synchronous communication. Synchronization means the synchronization of a power phase output to the power. As the synchronization method, for example, there are two kinds of: (1) a case where synchronization is realized in units of millimeters using the general-purpose communication; and (2) a case where synchronization is realized in units of microseconds using dedicated communication. The synchronization using the general-purpose communication corresponds to synchronization using widespread communication such as Ethernet (registered trademark) and wireless communication, and the synchronization is realized by transmitting and receiving a communication message including an information field of many bits. As for the synchronization using the dedicated communication, the synchronization is basically performed by directly transmitting and receiving a pulse and intended by transmitting and receiving the pulse in an optical fiber or a copper wire, and so on. In the synchronous communication unit 76b of the present embodiment, synchronous communication of any of these methods is possible. As for synchronization information in the present embodiment, it is assumed to include the communication message in the case of (1) and the pulse in the case of (2). The communication message is assumed to indicate, for example, a message exchanged in a wireless LAN in (1) (see FIG. 33 described later) or a beacon frame (see FIG. 15 to FIG. 18 described later).

As a physical configuration of the communicating unit 76, a mode is considered in which a second communicating unit to perform communication with a power source such as an energy storage and solar energy housed in a power electronics device is provided besides a first communicating unit to perform communication with an EMS, a local controller or other power electronics devices.

For example, a mode is considered in which the first communicating unit is realized by a wireless communication medium such as IEEE802.11 radio and 920 MHz radio in addition to a wire communication medium such as an optical fiber, a dedicated line and Ethernet, and the second the communicating unit is realized by CAN and RS-232/RS-485, and so on. The communication medium in an embodiment does not depend on a specific communication medium.

The power electronics device acquires a communication message from the EMS, the local controller and other power electronics devices through the first communicating unit. Meanwhile, the second communicating unit acquires specific information (such as rated capacity, charge/discharge start/end voltage, upper limit temperature, lower limit temperature, maximum charge/discharge current and rated voltage) of the energy storage battery management unit (BMU) or renewable energy generator connected to the power electronics device, and further acquires measurement information or setting information during operation.

In a case where the energy storage battery management unit (BMU) is connected to the power electronics device, measurement information (such as SOC, SOH, charge/discharge current and charge/discharge voltage) which is variation information at the time of operation of the energy storage battery management unit (BMU) is periodically acquired. As described above, although it is considered that the second the communicating unit is realized by communication media such as CAN and RS-232/RS-485 in addition to an electrical signal line (analogue input output/digital input output) which the vender originally defines, an embodiment does not depend on a specific communication medium.

Moreover, in a case where the power electronics device houses an energy storage, since an internal battery cell generally has a feature of self-discharge, it is considered to take into account a feature that the value varies over time, and arbitrarily notify information such as SOC and SOH to an EMS, a local controller, or other power electronics devices.

Moreover, a power electronics device operating as an inverter in an embodiment is not limited to application for the storage of the energy storage battery management unit (BMU), it can be applied to photovoltaic generation and wind power generation or the EMS and local controller that work together with them, and it is not restricted by a specific device mode.

An autonomous cooperation controlling unit 75 performs power allocation control processing, output power phase synchronization control processing, communication control processing and master/slave configuration determination processing. The entire outline of the power allocation control processing and the output power phase synchronization control processing is as illustrated in FIGS. 7A and 7B and FIGS. 8 and 8B described later. It is considered that the autonomous cooperation controlling unit 75 has functions of electricity application/detection processing, communication application/detection processing, normal confirmation at the time of wire connection detection and retransmission processing at the time of collision detection, to dynamically detect power wire connection and communication wire connection.

The autonomous cooperation controlling unit 75 acquires power attribute information and communication attribute information of other power electronics devices by the use of the communicating unit 76, and performs master/slave determination on the basis of the acquired power attribute information and communication attribute information and the power attribute information and communication attribute information of the own device. A power electronics device that becomes the subject (master) of power allocation control related to the allocation of electric energy which power electronics devices connected with at least one power line of a plurality of power lines inputs and outputs to the one power line, and a power electronics device that becomes the subject (master) of output power phase synchronization control related to the phase synchronization of power which the power electronics devices connected with the one power line outputs to the one power line, are decided (selected). The power electronics devices that are not the subject (master) of the power allocation control in the power electronics devices becomes an uncontrolled subject (slave) of the power allocation control, and the power electronics devices that is not the subject (master) of the output power phase synchronization control becomes an uncontrolled subject (slave) of the output power phase synchronization control. Here, the master/slave decision can be performed, regardless of whether the own device are connected with the same power line as the one power line. It may be presumed that the master of the output power phase synchronization control is decided from the power electronics devices connected with the same power line, or it may be allowed that a power electronics device that is not connected with the same power line becomes the master of the output power phase synchronization control. The master of the power allocation control may be decided from the power electronics devices connected with the same power line, or a configuration is also possible in which a power electronics device connected with a different power line from the one power line is decided as the master. In a case where power electronics devices are connected in a layered manner, the master can exist in each stage from the highest stage. In this case, the master of the lower stage becomes a slave of the master of the higher stage. Here, the autonomous cooperation controlling unit 75 may include a unit that detects whether a reference value for phase synchronization is received from the outside such as the power system or whether the power failure such as the blackout occurs. The reference value for the phase synchronization from the outside may be input from the communicating unit 76 or other paths.

The autonomous cooperation controlling unit 75 can process supervisory control information for real time and supervisory control information for non-real time, which are required for a power application function at the time of normal operation, in addition to operation such as a master/slave decision performed at the time of initial installation or anomalous occurrence.

For example, in the case of a function of the output power phase synchronization control, the supervisory control information for real time processes phase error information for time synchronization (for example, an error between the clock of a PLL circuit and the clock of a communicating unit) in addition to the control instruction values and actual measurement values of the voltage and frequency.

On the other hand, the supervisory control information for non-real time includes operation plan information distributed by a higher EMS/local controller. The operation plan information denotes plan information based on demands from the energy storage (BMU) and power generating device of renewable energy each connected to the power electronics device and power system network, and can be expressed in a format in which "the horizontal axis indicates the time and the vertical axis indicates the electric energy." To form this information, as an example, there is a method of using information unique to charge/discharge control of the energy storage (BMU) or the power generating device of renewable energy. For example, in the case of the energy storage (BMU), there are generally concepts of rated charge/discharge power expressed in W (Watt), rated capacity expressed in Wh (Watt hour), SOC (State Of Charge) expressed in percentage and dischargeable time and chargeable time associated with the SOC.

In the constant-current charge method in which is a general charge method of the energy storage (BMU), the electric energy (or current amount) input/output by the battery cell in the energy storage (BMU) remains in a constant state until the SOC expressed in percentage reaches a predetermined threshold. In view of this, by acquiring a value of the SOC from the energy storage (BMU), it is possible to calculate the chargeable time and dischargeable time, the maximum charge/discharge power and the electric energy required for discharge and charge (i.e. product of the dischargeable and chargeable time and the power), which are associated with that information. In the constant current charge, since there is a characteristic that the current amount required for charge is minimized after the SOC exceeds the predetermined threshold, it is possible to calculate an approximation of information required for a charge/discharge plan.

Also, as the electric energy at the time of charge/discharge control, it is possible to use the current amount expressed in Ah (Ampere hour) and the voltage amount expressed in Vh (Volt hour) in addition to the electric energy expressed in Wh (Watt hour).

Also, since it is not possible to store (charge) power in the case of a power generating device of renewable energy such as photovoltaic generation and wind power generation, there is no concept of the SOC and it operates as a dedicated device for discharge. By contrast, in a case where a device connected to a power electronics device is an accumulator of heat, since it is not possible to discharge power, it is controlled as a dedicated device for charge.

Based on these items of information, the operation plan of the power electronics device is made as plan information to implement specific charge/discharge operation with respect to the power source (or load) connected to the device.

At the time of preventing the instantaneous interruption of power supply in the power system network, it is desirable that real-time operation to adequately transmit and receive communication message is performed. Meanwhile, at the time of control at relatively gradual time intervals in the nighttime period, it is considered to perform non-real-time operation in which the operation timing intervals are set. An embodiment does not depend on specific activation operation such as real time and non-real time.

Figure 7A:
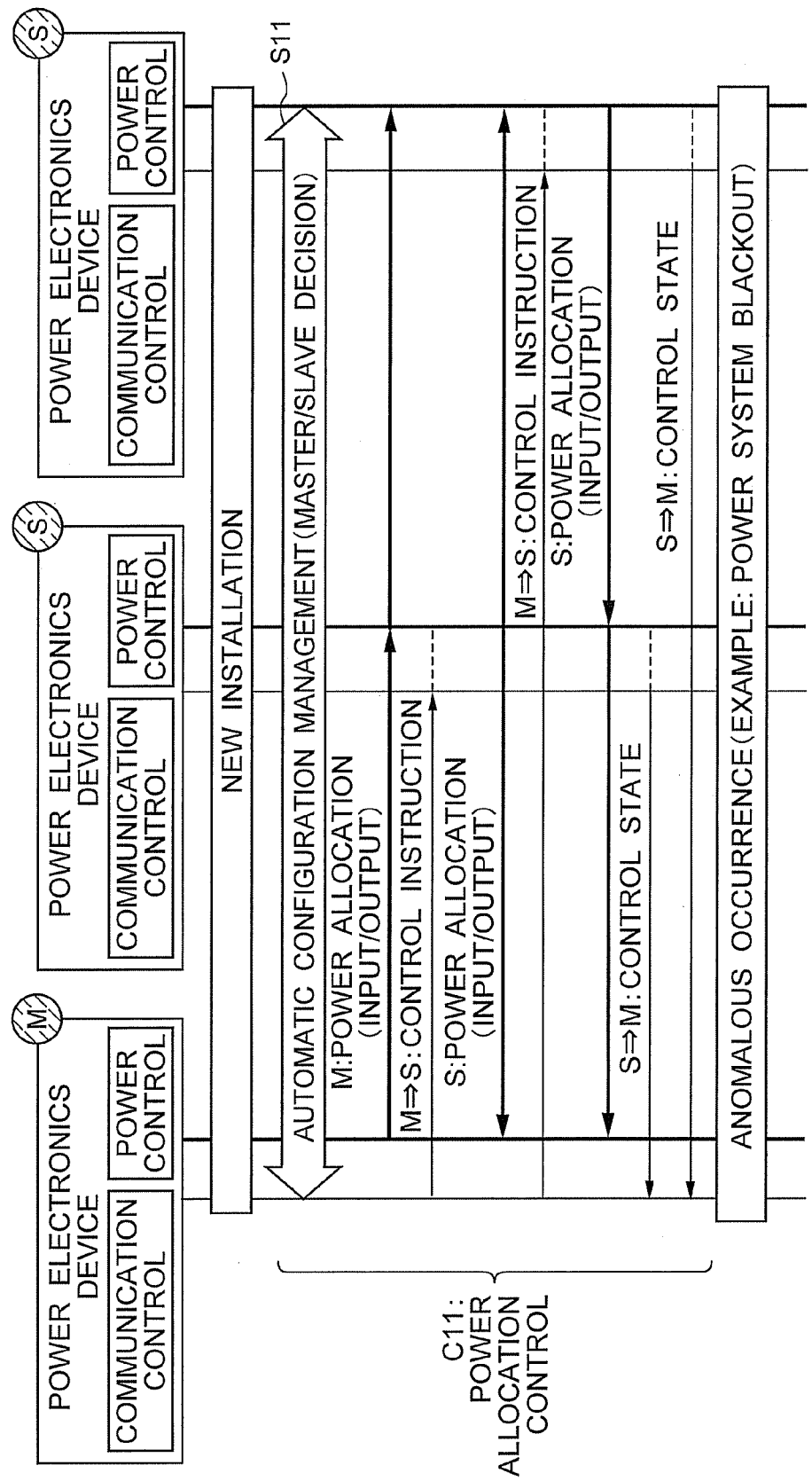
FIGS. 7A and 7B show an overall operation sequence of a plurality of power electronics devices according to an embodiment.
Figure 7B:
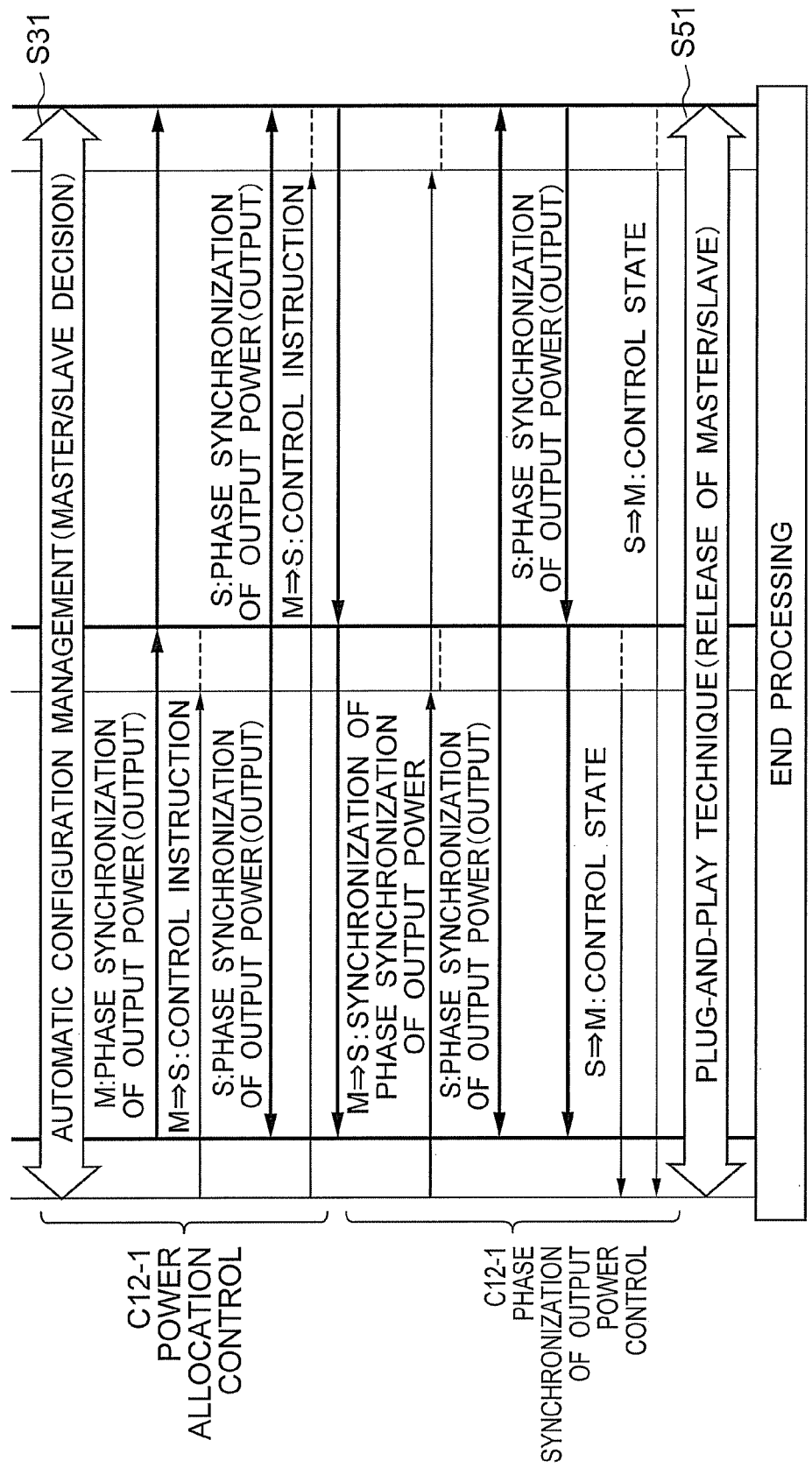

FIGS. 7A and 7B illustrates the entire sequence of automatic configuration management (master/slave decision of power allocation control/output power phase synchronization control), power allocation control and output power phase synchronization control of power electronics devices. In FIG. 7A, three power electronics devices are newly set, the automatic configuration management (master/slave decision of the power allocation control) is performed in step S11, and power allocation control C11 is performed. When abnormality such as the blackout in the power system occurs during the power allocation control, the automatic configuration management (master/slave decision of the power allocation control and the output power phase synchronization control) is performed again in step S31, and subsequently power allocation control C12-1 and output power phase synchronization control C12-2 are performed. From this operation state, for example, in a state where the driving of one power electronics device is stopped to reduce the system scale when the power system is maintained or device failure occurs, if the device is the master, it is considered that the plug-and-play mechanism is operated to transfer the right of the master to other power electronics devices (S51).

Figure 9:
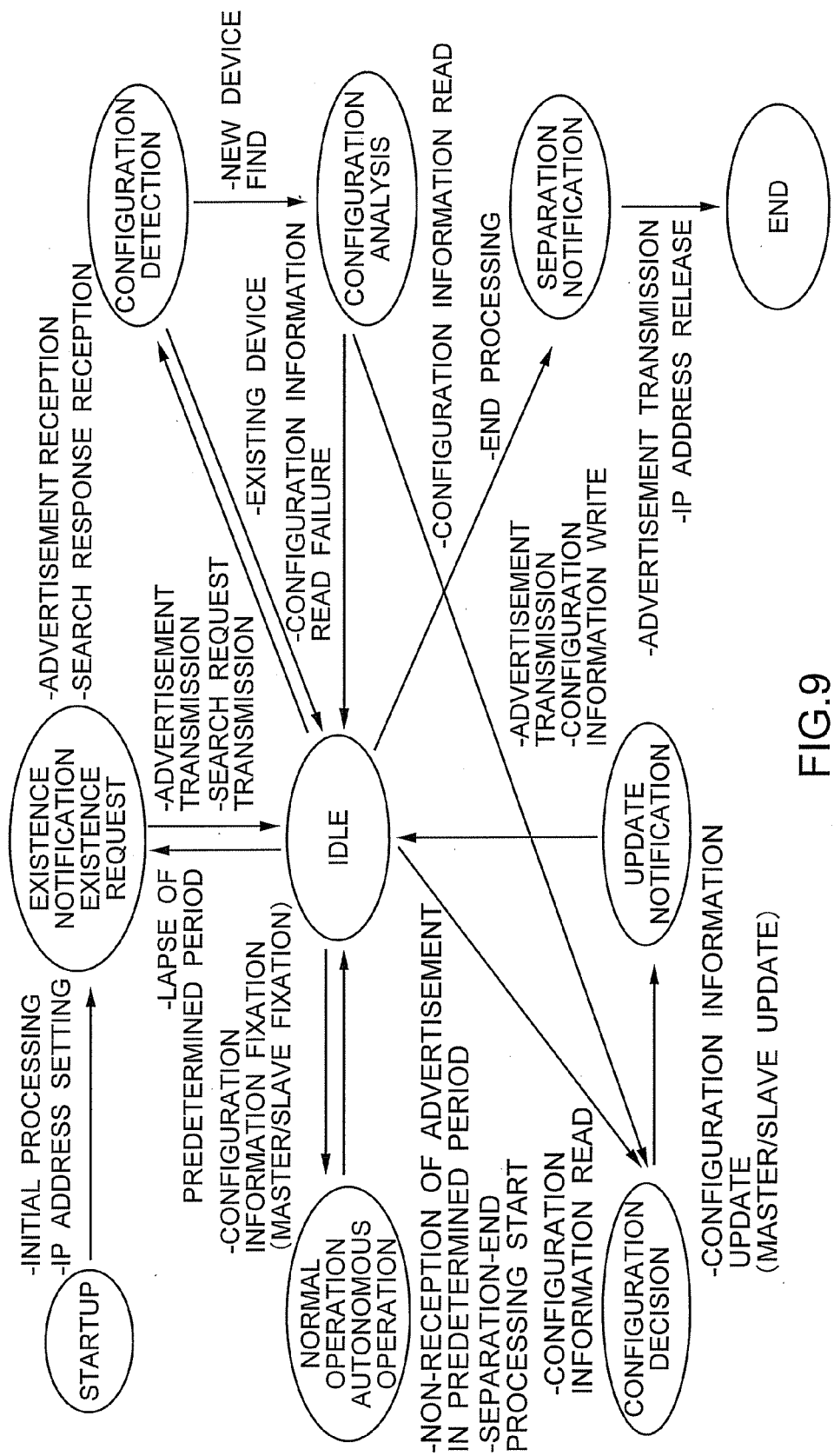
FIG. 9 is a state transition diagram of a power electronics device according to an embodiment.

Moreover, in a case where the driving of all power electronics devices is stopped, the termination procedure (termination processing from separation notification) in FIG. 9 is executed to release (reset) the roles of the master/slave assigned to each power electronics device (S51).

Figure 8A:
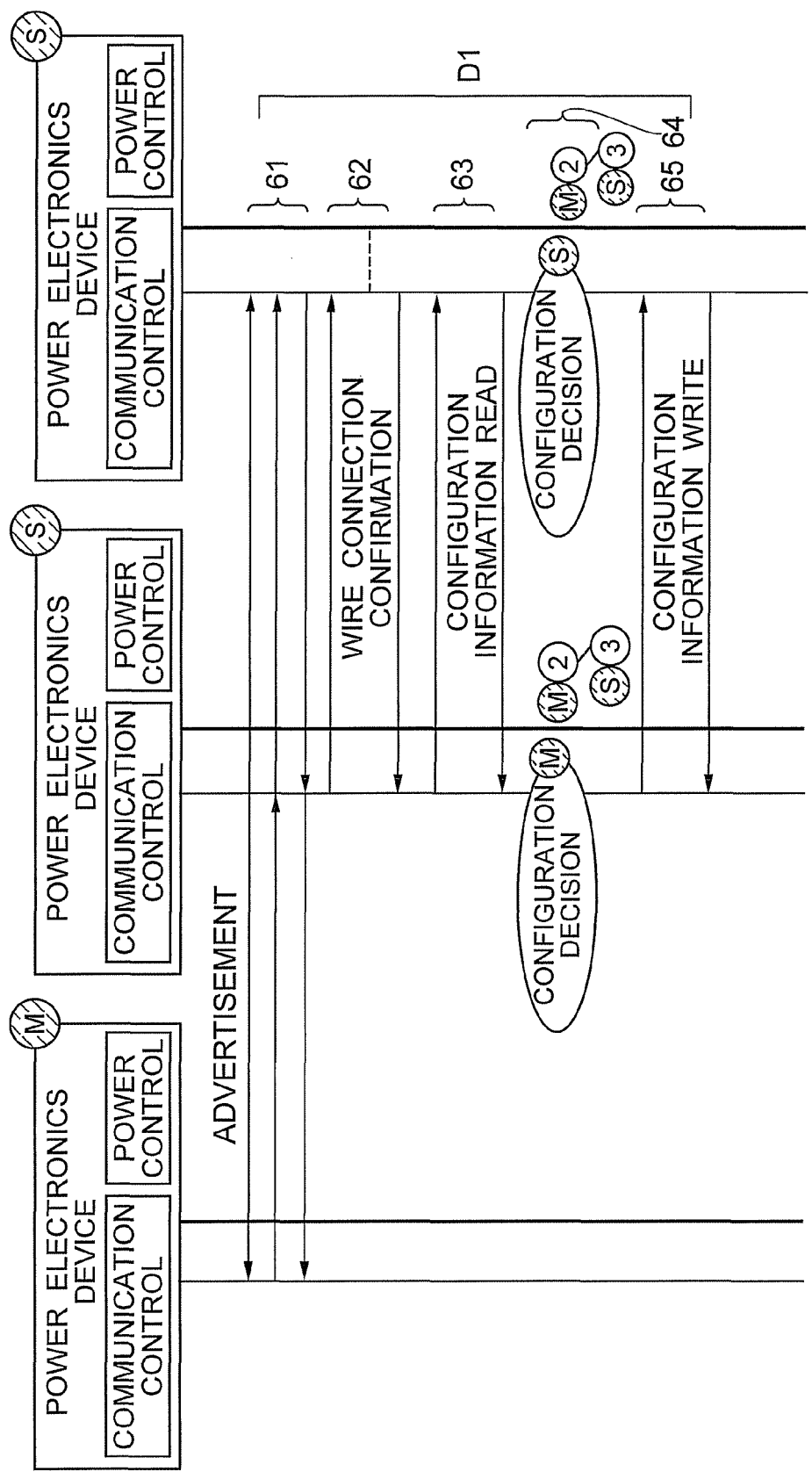
FIGS. 8A and 8B show a configuration management sequence diagram of a plurality of power electronics devices related to an embodiment.
Figure 8B:
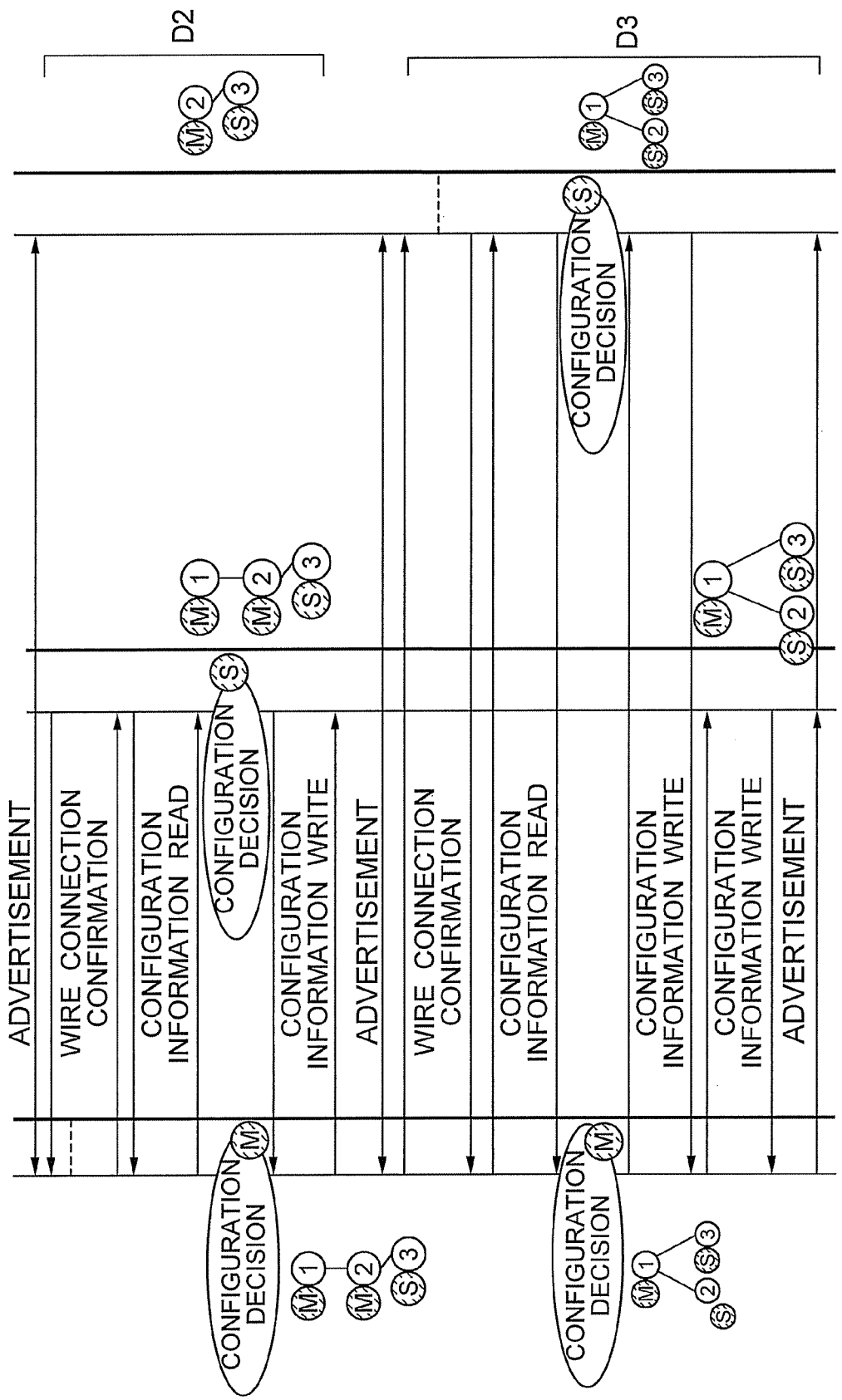

First, in step S11, automatic configuration management (master/slave decision of power allocation control) is performed to decide the master and the slave. This operation sequence is illustrated in FIGS. 8A and 8B. FIGS. 8A and 8B show an operation sequence diagram of the automatic configuration management (master/slave decision). There are three power electronics devices in the figure and it is assumed that the priority is preconfigured in order from a unit number 1, a unit number 2 to a unit number 3 in order from the left. Although a character of "M" represents the role of the master and a character of "S" represents the role of the slave, it is assumed that the master and the slave are not decided at the time of the start of the operation sequence. It is assumed that it corresponds to the case with FIG. 5A in the automatic configuration management in step S11, and only master/slave of the power allocation control is decided.

First, each power electronics device transmits an advertisement message and notifies its own existence in first configuration decision procedure D1 (S61). In the example of FIG. 8A, the unit number 2 acquires configuration information from the unit number 3 after performing wire connection confirmation of the communication line and power line of the unit number 3 (S62), and performs master/slave determination (S63). After determining that the unit number 2 becomes the master (S64), by writing updated configuration information in the unit number 3 (S65), the content of configuration information is matched between two devices. Here, the unit number 3 may acquire the configuration information from the unit number 2 and perform determination in the same way. In this case, the same determination result is acquired if the determination algorithms are the same, a configuration is possible in which the writing of the configuration information in the other device is omitted.

As second configuration decision procedure D2, the procedure similar to D1 is executed between the unit number 1 and the unit number 2, and the latest configuration information with the unit number 1 as the master is constructed (D2). At this time, the configuration information of the unit number 3 remains old.

In third configuration decision procedure D3, when the unit number 1 performs master/slave configuration decision with the unit number 3, the unit number 1 writes configuration information in the unit number 3 and the unit number 2 that is the master of the unit number 3. At this time, the configuration information is matched between three power electronics devices in the system.

When the master and slave related to the power allocation control are decided for the power electronics devices of the unit numbers 1 to 3 in the operation sequence as illustrated in FIGS. 8A and 8B, power allocation control C11 between a plurality of power electronics devices is performed as illustrated in FIG. 7A.

Power allocation control C11 is one of the functions of autonomous cooperation control to perform allocation control of the power input/output at the time of normal operation and self-operation. In a general power system, a higher EMS or local controller notifies the instruction value of power control (example: the instruction value of active power and reactive power) to a power electronics device (PCS) for a lower energy storage/solar energy by the use of a communication message. In the autonomous cooperation control, since a plurality of power electronics devices individually perform cooperative operation without using such an external EMS device, it is essential to dynamically assign the role of the master that issues the instruction value.

In the operation sequence diagram in FIG. 7A, a power electronics device that became the master implements a control instruction of the input/output of power such as the charge and the discharge to a slave device while inputting and outputting the power such as the charge and the discharge in power allocation control C11. A power electronics device that became the slave periodically transmits its own various control states (for example, a report of the safe input or output of requested electric energy) to the master. It only has to use an arbitrary method for the decision algorithm of a specific allocation amount, and the explanation is omitted in the present specification. Here, at the time of performing the power allocation control, in a case where operation is performed while being connected to the power system, the reference value from the power system only has to be used as phase information and synchronization is not necessary using communication between devices.

Meanwhile, in a case where malfunction such as the blackout occurs in the power system, it is not possible to acquire reference information such as the reference value from the power system, it is preferable to perform mutual synchronization between devices. In the example illustrated in the figure, in a case where malfunction such as the blackout occurs, automatic configuration management (master/slave decision) is performed again to decide the master and the slave. Here, the master/slave of output power phase synchronization control are also decided in addition to the master/slave of the power allocation control. Also, the decision method of the master/slave of the output power phase synchronization control is described later. After the decision, power allocation control C12-1 and output power phase synchronization control C12-2 are performed between a plurality of power electronics devices. In the example illustrated in the figure, the same devices as above are selected as the master and slave of the power allocation control and the output power phase synchronization control. Output power phase synchronization control C12 between a plurality of power electronics devices is one of the functions of autonomous cooperation control to perform frequency control and phase synchronization control of the power output at the time of self-operation. Under the control by the master of the output power phase synchronization control, operation is performed such that a plurality of slaves are adjusted to the frequency and PLL phase (50 Hz/60 Hz) of the master. Here, as the phase control, it is possible to use the one that applies the flow from a general power system.

FIG. 9 illustrates a state transition diagram of a power electronics device according to an embodiment. The device state is shown by an oval in which characters are filled in the figure. The transition between states is triggered by the transmission/reception of a communication message or the expiration of a timer period. The device starts from the state of "startup" and ends in the state of "end". The states that can be changed during these include the states of "existence notification/existence demand", "IDLE", "configuration detection", "configuration analysis", "configuration decision", "normal operation/self-operation", "update notification" and "separation notification".

For example, at the time of the start of an application program, initial processing such as IP address acquisition is performed. Afterwards, it changes to the state of "existence notification/existence demand" to transmit an advertisement message for notification of the device existence and a search request message for confirmation of the existence of other devices. After the transmission, it shifts to the state of "IDOL", and, in a case where an advertisement message or a search response message is received from other devices within a predetermined period, it changes to the state of "configuration detection". It changes from "configuration detection" to "configuration analysis" and then "configuration decision" in order, and processing of configuration detection, configuration analysis and configuration decision is performed respectively. Although the unit number and the unit identifier are fixed information at the time of shipment or system construction, communication wire connection and power wire connection information are information that can be dynamically acquired. In the configuration detection and the configuration analysis, in a case of receiving a communication message from another device as to the communication wire connection, it recognizes that the device and the own device mutually belong to the same communication broadcast domain. As to the power wire connection, in order to determine whether to be connected with the same bus line, for example, in a case of being connected in parallel to the alternating-current system, a method is considered in which the autonomous cooperation controlling unit of a power electronics device acquires information on the power line type (three-phase alternating current/two-phase alternating current/single-phase alternating current/direct current), the voltage value and the frequency value to mutually exchange the information between power electronics devices. At the time of master/slave decision, selection is performed by determination criteria as presented in FIG. 13B described later, such that a plurality of masters do not exist with respect to one slave every device. When the configuration decision processing is completed, it changes to "update notification" to perform update notification of configuration information, and, when the configuration information is fixed in each device, it changes to "normal operation/self-operation" to thereby shift to the operation state of normal operation (corresponding to power allocation) or self-operation (corresponding to phase synchronization of output power). Here, a communication message of a control state is periodically exchanged and an advertisement message is transmitted. In a case where the own device finishes operation, it changes to "separation notification", an advertisement for separation is transmitted or the IP address is released, and it changes to "end". In a case where other devices finish operation or an advertisement is not received from other devices within a predetermined period, it shifts to each state of the automatic configuration management (configuration detection/configuration analysis/configuration decision) again. In a case where communication is used for determination of an unreceived advertisement, since it is difficult to specify a failure part (a device failure or a power system failure) depending on the circumstance, it is preferable to use power line information arbitrarily.

Figure 10:
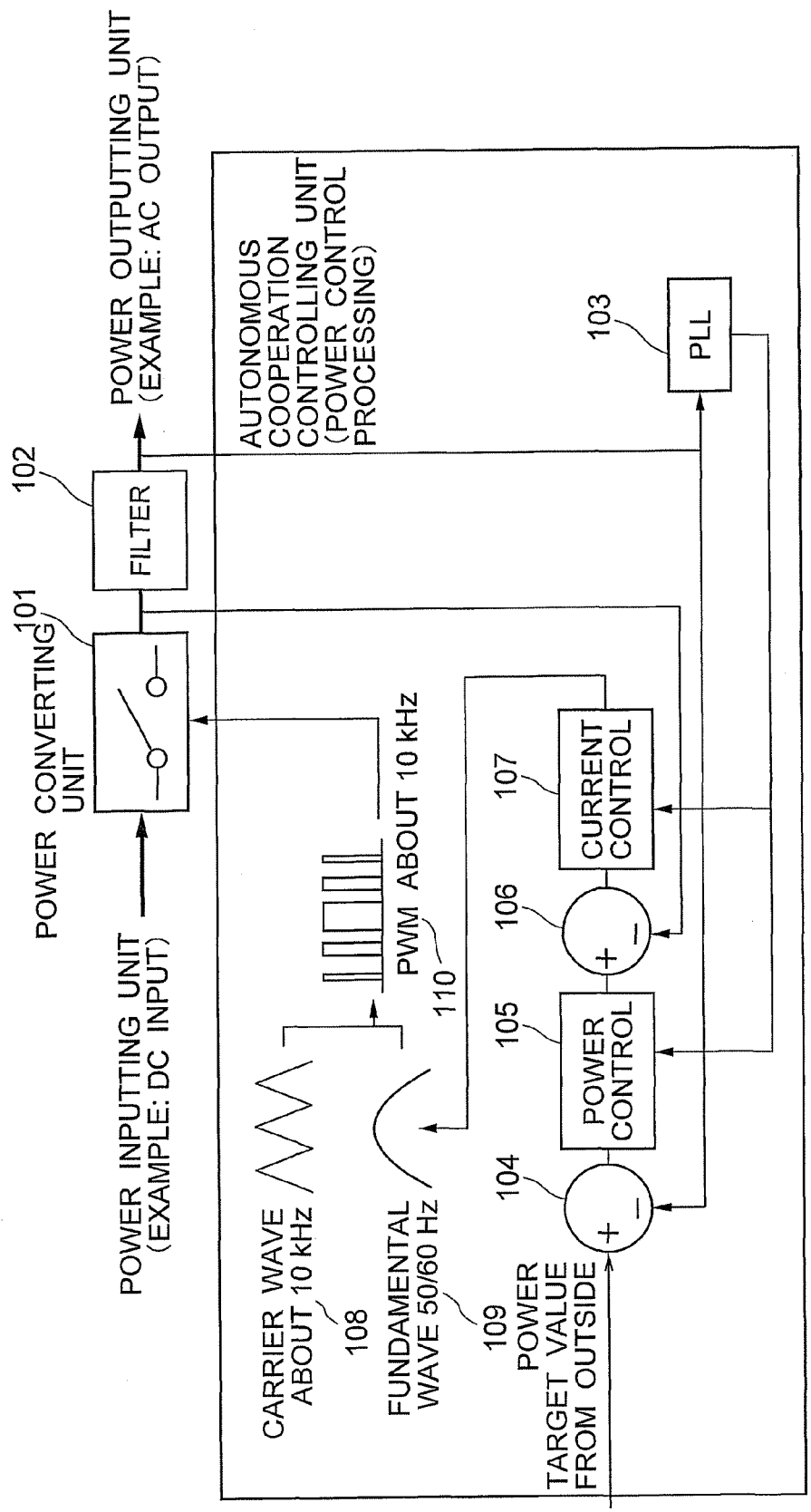
FIG. 10 is a schematic view of power control processing of a power electronics device according to an embodiment.

FIG. 10 illustrates a schematic configuration related to power control processing in the autonomous cooperation controlling unit 75 in the power electronics device of FIG. 6.

In the processing of power control (allocation control and synchronization control), an alternating-current signal (AC power) is generated by performing the power control based on the power target value from the outside (example: the instruction value of active power or inactive power from an EMS, a local controller or a master). Therefore, there is mounted a carrier wave outputting unit 108 that generates a carrier wave (about 10 KHz) and a fundamental/modulation wave outputting unit 109 that generates a fundamental/modulation wave (for example, frequency of 50/60 Hz in the power system in Japan).

The carrier wave is a reference signal which is not modulated and which is also called "carrier", and denotes a triangular wave with a constant frequency, amplitude and phase. It is possible to transmit a signal by changing the frequency, amplitude, and phase of the carrier wave. The fundamental/modulation wave denotes the sine wave of the lowest frequency among sine waves of various frequencies forming one non-sine wave (distorted wave). A PWM (Pulse Width Modulation) unit 110 generates a pulse waveform based on these carrier wave and fundamental/modulation wave.

PWM is one of modulation methods and implements modulation by changing the duty ratio of a pulse wave. For example, in the case of an inverter controlled by PWM, to decide the timing at which a signal is flowed into a gate electrode of a switching element by a microcomputer or the like, a triangular wave in the carrier wave and a sine wave in the fundamental wave are generated. Further, a gate drive that flows a signal into the gate electrode detects the intersection between the carrier wave and the fundamental wave, and turns on/off two (single-phase alternating current), four (single-phase alternating current by a three-level inverter), six (three-phase alternating current) or 12 (three-phase alternating current by a three-level inverter) switching elements. In the figure, these switching elements are expressed by a power converting unit 101. As a result of ON/OFF of the switching elements, a pulse waveform is acquired and the average voltage becomes the alternating-current power of the sine wave. A filter 102 aims to smooth the alternating-current power output from the power converting unit 101 and prevent the cross current.

A PLL (Phase Lock Loop) 103 is an electronic circuit that performs feedback control based on an input periodic signal and outputs a signal synchronized with the phase of the input signal from another oscillator in the PLL 103. It is possible to produce various signals in a stable state by operating the signal provided by feedback.

The PLL can treat the shape of a carrier wave expressed by $\int \omega t dt$, the shape of a fundamental/modulation wave expressed by $\sin(\omega t)$ and the shape of a pulse wave expressed by $f(\omega t)$, from phase information expressed by $\omega t$ ($\omega$: angular frequency, t: time). Power control 105 and current control 107 are executed while the output results of the PLL lead to internal feedback control through comparators 104 and 106.

Here, one example of a synchronization method at the time of output power phase synchronization control in a plurality of power electronics devices (such as inverters) is described. As for the synchronization method, a method of matching output waveforms of PWM and a method of matching output waveforms of PLL are considered.

For example, the former method of matching the output waveforms of PWM is a method of directly exchanging pulse waves between the master and the slave by the use of an optical fiber or the like. In this method, phase control is performed by inputting synchronization information (pulse wave) from the master into PWM.

On the other hand, the latter method of matching the output waveforms of the PLL 103 is a method of exchanging pulse waves which the PLL generates on the basis of the actual measurement value of the sine wave actually measured in the power outputting unit (the reference value related to the phase) by the use of not only the optical fiber but also other communication media. In this method, the synchronization information (frequency/phase error) is input in the PLL and the phase control is performed. In this case, in a case where a general-purpose communication medium is used, taking into account the clock error between the internal PLL and the communication medium, it is considered to notify the remainder result between the clock value of a wavelength expressed by the pulse width interval and the internal clock value of the communication medium, as an internal error at the time of synchronization communication.

As described above, in a case where a power electronics device (inverter) connects with the power system, the reference value related to a phase only has to operate with reference to the system. However, at the time of anomalous occurrence such as the blackout, it is necessary to synchronize the output of PWM or PLL of the master with the slave by the use of communication. Here, in an embodiment, the communication medium is applicable without depending on a specific form.

Figure 13B:
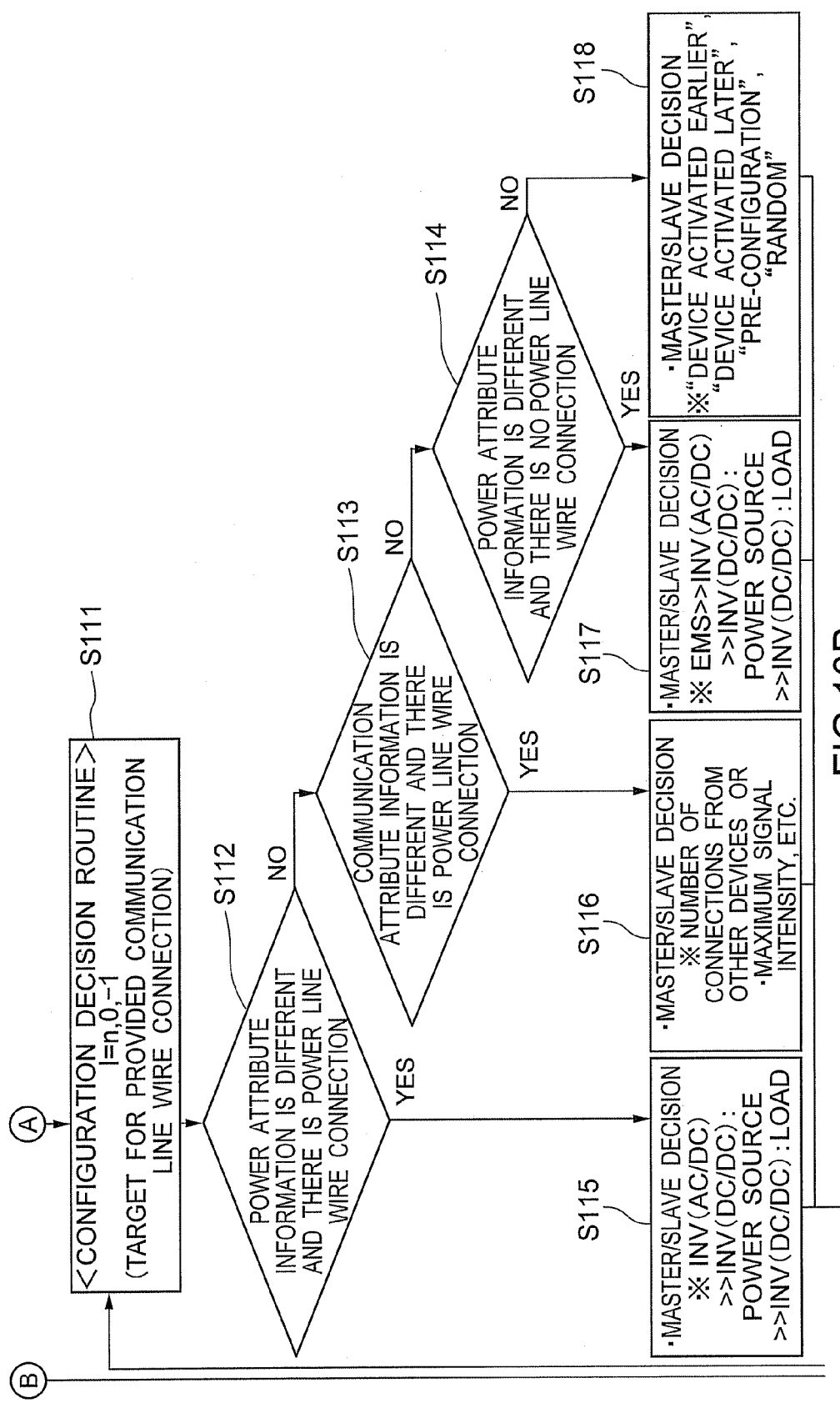
Figure 13C:
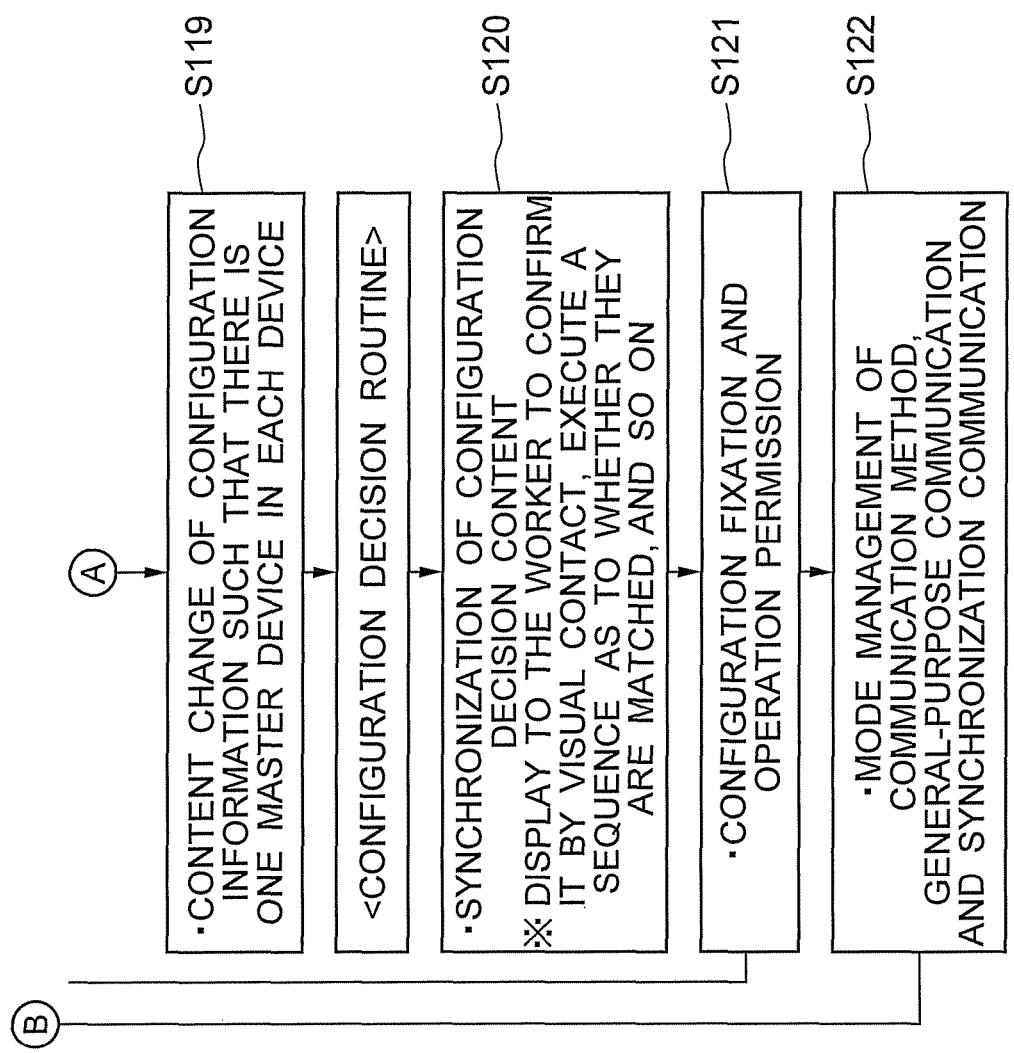

FIGS. 13A-13C present operation flowcharts in automatic configuration management of a power electronics device according to an embodiment. This operation flows illustrate one example and the present embodiment is not limited to this. Although there are initial installation, normal operation and anomalous occurrence in the whole of the operation process, the flowcharts of FIGS. 13A-13C target configuration detection and configuration decision at the time of the initial installation and anomalous occurrence.

In step S101, at the time of the initial installation (initial processing after startup), a power electronics device acquires its own attribute information and determines which of EMS, INV (AC/DC) and INV (DC/DC) it is. Further, it further determines a device such as a power source and a load that is directly connected with the power electronics device is which of INV: power source (energy storage), INV: power source (PV) and INV: load.

In step S102, it confirms the modes of its own communication method, general purpose communication and synchronous communication. For example, it confirms a used communication scheme and confirms whether it is the centralized communication or it is the distributed communication.

It is decided to perform a lifetime inspection in step S103 and perform configuration detection in step S104. In a case where there is no device entry or no change in the configuration ("NO" in S105), it stands by for a certain period of time (extends the lifetime), and it returns to step S103. Whether abnormality occurs is inspected in the lifetime inspection, and, in a case where the abnormality is detected, it is decided to perform the configuration detection ("YES" in S104). In a case where there is the device entry or the change in the configuration, it proceeds to step S107. Whether there is the device entry or a change in the configuration may be determined by receiving an advertisement from other devices, for example. In a case where the own device starts, it becomes the device entry and therefore it is determined that there is the device entry. Moreover, in a case where a device connected thereto is changed, it can be determined that the configuration is changed.

In step S107, by detecting wire connection of the power line and wire connection of the communication line in order to perform dynamic detection of a system configuration, a device connected to the same power line as the own device and a device that can perform communication with the own device are specified. Here, the communication line can include both wire and wireless. In step S108, power attribute information, communication attribute information and configuration management information are acquired from a device that can be communicated via a wireless or wired communication network. In a case where there is a master in the other devices ("YES" in S109), steps S108, S109 and S110 are recurrently executed for the master.

That is, there is a case where, when the power electronics device acquires the above-mentioned attribute information and configuration management information from another device, the master and the slave are already decided between the other device and another device. In this case, the acquisition of information on the master device described in the configuration management information of the device is further attempted. As a result of this, in a system in which a plurality of power electronics devices are installed, it is possible to avoid the overlap of masters and prevent the collision of the control right at the time of realizing an autonomous-cooperation power application function such as the output power phase synchronization control and the power allocation control.

Although it shifts to a configuration decision routine to decide the master/slave after a series of acquisition processing of information is completed, it is preferable to confirm the communication wire connection and power wire connection between devices to be determined before a specific configuration decision is performed.

As described above, in the power electronics device according to an embodiment, different power applications (e.g. the output power phase synchronization control and the power allocation control) is realized by combining a plurality of devices depending on the intended purpose. Here, there is a case where the connection relationship in the communication aspect and the connection relationship in the power aspect do not have a one-to-one correspondence with each other depending on the system installment format.

For example, a set of a plurality of power electronics devices is defined as S and subsets of S are defined as S1 and S2 (S1∪S2=S, S1∩S2=0). It is assumed that a power electronics device of Si (i=1, 2) is connected to electricity network Pi and communication network Ci. As a result, since there are totally four kinds of connection relationships in the communication and power aspects, it is preferable to decide whether to start master-slave determination processing according to each state.

For example, in a case where there is a wire connection relationship in the communication aspect and is no wire connection relationship on the power aspect, two power electronics devices are not connected with the same bus line and therefore synchronous processing for the output power phase synchronization control or power allocation control is not necessary.

Here, in an algorithm to acquire and distribute master/slave configuration management information, it is considered to apply a procedure of performing collective management by the use of broadcast communication or multicast communication in the system in addition to the above-mentioned procedure of recurrently making an inquire. An embodiment does not depend on a specific procedure.

After the wire connection relationship is confirmed, each power electronics device performs master/slave determination in an autonomous cooperation controlling unit on the basis of the content of the acquired information (S111 to S119) and updates the content of the configuration management information. The master/slave of output power phase synchronization control is decided for the power line of alternating current in a case where a predefined condition is established, such as a case where malfunction like the blackout occurs in the power system and the reference value for phase synchronization is not received and a case where the autonomous driving is performed without receiving a reference from the outside in a factory or the like. It does not have to be performed in the power line of direct current because phase synchronization is not necessary.

In this flow, the determination is performed for a device with the wire connection relationship of the communication line. The master and the slave are decided depending on a case where power attribute information is different and there is the power line wire connection relationship ("YES" in S112), a case where communication attribute information is different and there is the power line wire connection relationship ("YES" in S113), in a case where the power attribute information is different and there is no power line wire connection relationship (S114) and in other cases ("NO" in S114) (S115, S116, S117 and S118).

For the specific master/slave determination priority, a loop to compare the device types between two devices is performed. The master and the save are decided by applying the priority weighting decision criteria in order of EMS>>local controller>>INV (AC/DC): energy storage>> INV (AC/DC): solar energy>>INV (AC/DC)>>INV (DC/DC): energy storage>>INV (DC/DC): solar energy>>INV (DC/DC)>>smart mete (S115 and S117). This especially corresponds to the decision related to the power allocation control.

When each device starts first, it understands its own system type (for example, information on the power source or load connected with the power electronics device) and reflects it to the master/slave decision priority. A local controller is classified into EMS. As described above, taking into account cooperation with the power system network or EMS because a power electronics device (AC/DC) is located at a higher level in the system configuration, it is preferable to select a local controller as the master in view of the efficient aspect. Regarding a power electronics device (DC/DC), although there are a power supply (energy storage), a power source (PV) and a load or the like as a connection instrument, taking into account a device in which the possibility of operating at the time of anomalous occurrence is the highest, it is preferable to select the power source (energy storage) that can save the power required for operation in advance of the anomalous occurrence, as the master, in view of controllability.

In a case where there is a power line wire connection relationship and the communication attribute information is different, the master and the slave are decided on the basis of the number of connections from other devices or the degree of the signal intensity (S116). Examples of a case where the communication attribute information is different include a case where the roles are different like the roles of a base station and a slave station, a case where the number of connections is different and a case where the signal intensity is different. For example, this step corresponds to a decision related to the output power phase synchronization control.

In a case where the power attribute information is the same, for example, it is considered to decide a device with the larger sequence number of the configuration management information as the master. Moreover, in a case where the above-mentioned priority is not applied, the master and the slave are decided on the basis of standards such as "device activated earlier", "device activated later", "pre-configuration" and "random" (S118).

Moreover, the content update of the configuration information is implemented such that the number of masters is one in each power electronics device (S119).

Since there is a possibility that the collision of the control right occurs when an autonomous-cooperation power application function is executed in a state during such a master/slave configuration decision, it is preferable to display the configuration decision content to the worker to confirm it by visual contact or execute an operation sequence as to whether they are matched (S120). As the latter operation sequence, since information between a plurality of devices existing in the system is matched, it is considered to wait for a certain period of time until the start of normal operation or sequentially acquire configuration management information and compare the content.

If the matching of the content of the configuration information can be confirmed by each device, the master/slave configuration is fixed by this content and each device decides the driving permission. Each device that decided the driving permission performs cooperative operation (S121). Afterwards, whether there is in a change in the modes of the communication method, general-purpose communication and synchronous communication is managed (S122), and it returns to step S103.

At the time of normal operation after the configuration decision is finished, supervisory control of the power is implemented while communication messages related to real-time control or non-real-time control are exchanged between devices. For example, as information on the supervisor system, there are the current value of effective power (W), the current value of reactive power (VAR) and the present values of the unit voltage or power factor per phase. Moreover, as information on the control system, there are the connection permission with respect to the electricity network, the use permission of the PV output, the use permission of the energy storage output, the use permission of effective/reactive power control, the target value of the effective power (W), the target value of the reactive power (VAR), the target value of the power factor, the output level value of the effective power (%), the output level value of the reactive power (%) and a frequency value. In addition, as information on the rating system, there are the rated effective power (W), the rated apparent power (VA) and the rated reactive power (VAR). It can be considered as a general embodiment that the control information can be read and written and surveillance/rating information can be read only.

Detailed operation from automatic configuration management to autonomous cooperation control (in particular, output power phase synchronization control) in an embodiment is explained using FIG. 14 to FIG. 18.

FIG. 14 illustrates briefly system configurations at the time of realizing the output power phase synchronization control.

As described above, in the power allocation control in the autonomous cooperation control, a power electronics device that became a master implements an instruction of the power allocation amount to a power electronics device that became the slave. This should be instructed within the power handling capability of the slave. On the other hand, the mechanism of phase synchronization for power output to the alternating-current system is required in the output power phase synchronization control.

In a case where abnormality such as the blackout occurs in the power system or the power system in a factory or building is separated from the power system and operated, it is required to synchronize PLL phases between devices in view of cross current prevention. At this time, although communication is used, communication control has a different mechanism of a data link layer or physical layer every standard or product.

When these general views are summarized, as illustrated in FIG. 14, it is possible to classify them into the case of distributed communication processing (processing called "ad-hoc communication" in the case of wireless communication) and the case of centralized communication processing (processing called "base station communication" in the case of wireless communication). Taking into account that the functions of general-purpose communication and synchronous communication described above in an embodiment are classified in this communication processing classification in the system, as illustrated in FIG. 14, it is possible to consider a case where the power allocation control master matches the synchronization information transmission device (a case where it matches the output power phase synchronization control master) and a case where the power allocation control master does not match the synchronization information transmission device.

Figure 15:
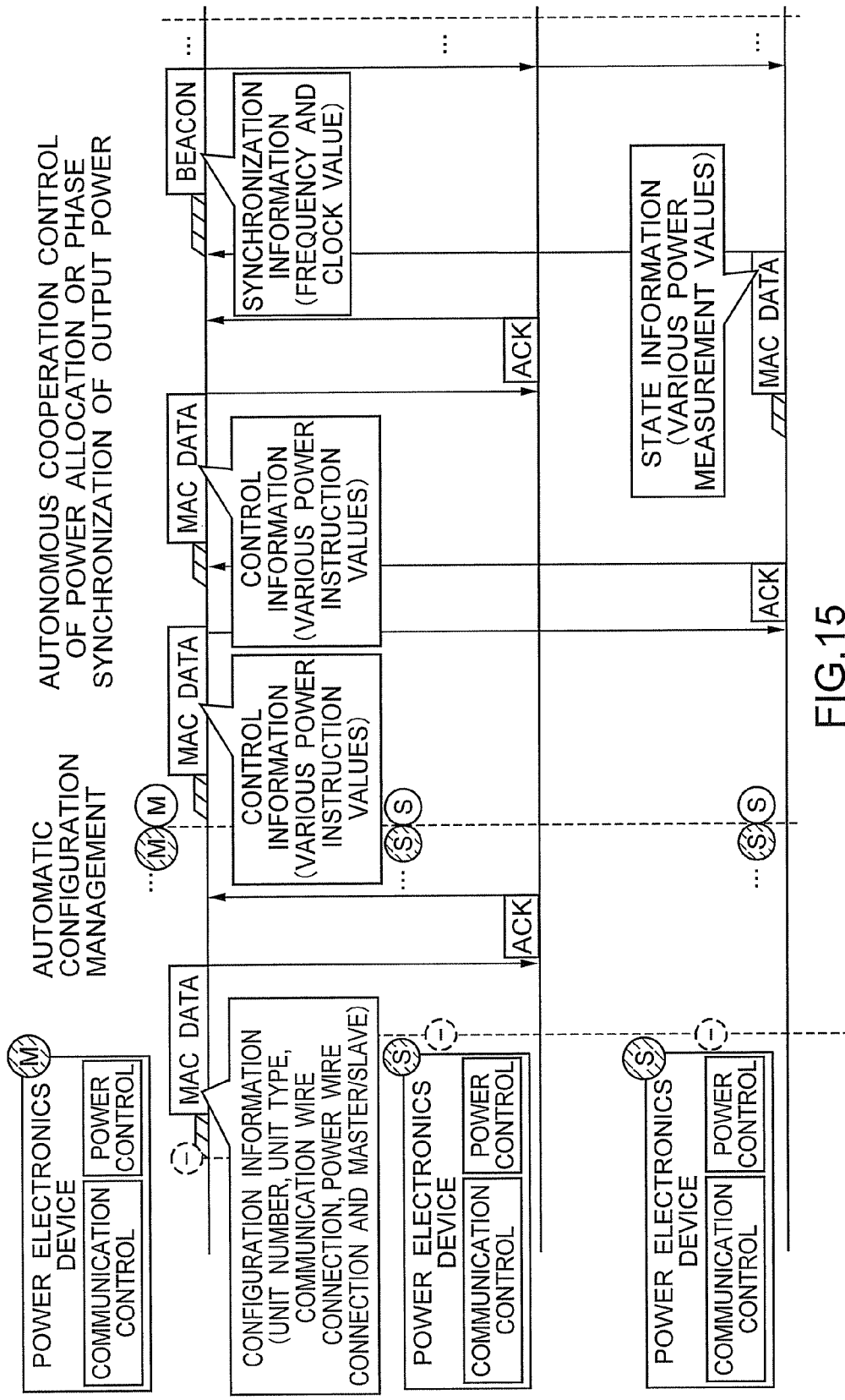
FIG. 15 is a schematic view related to the phase synchronization of output power of a plurality of power electronics devices according to an embodiment.
Figure 16:
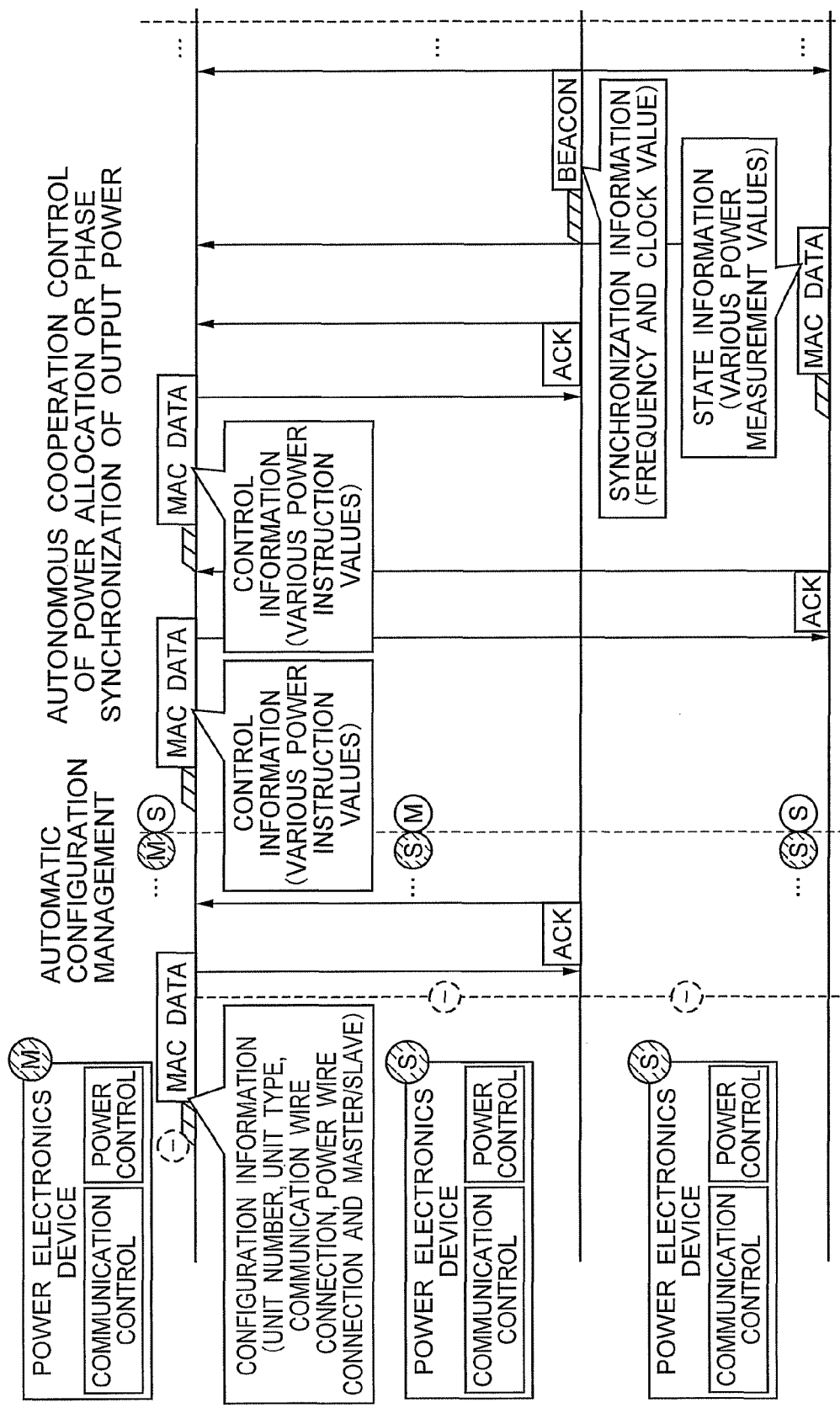
FIG. 16 is a schematic view related to the phase synchronization of output power of a plurality of power electronics devices according to an embodiment.
Figure 17:
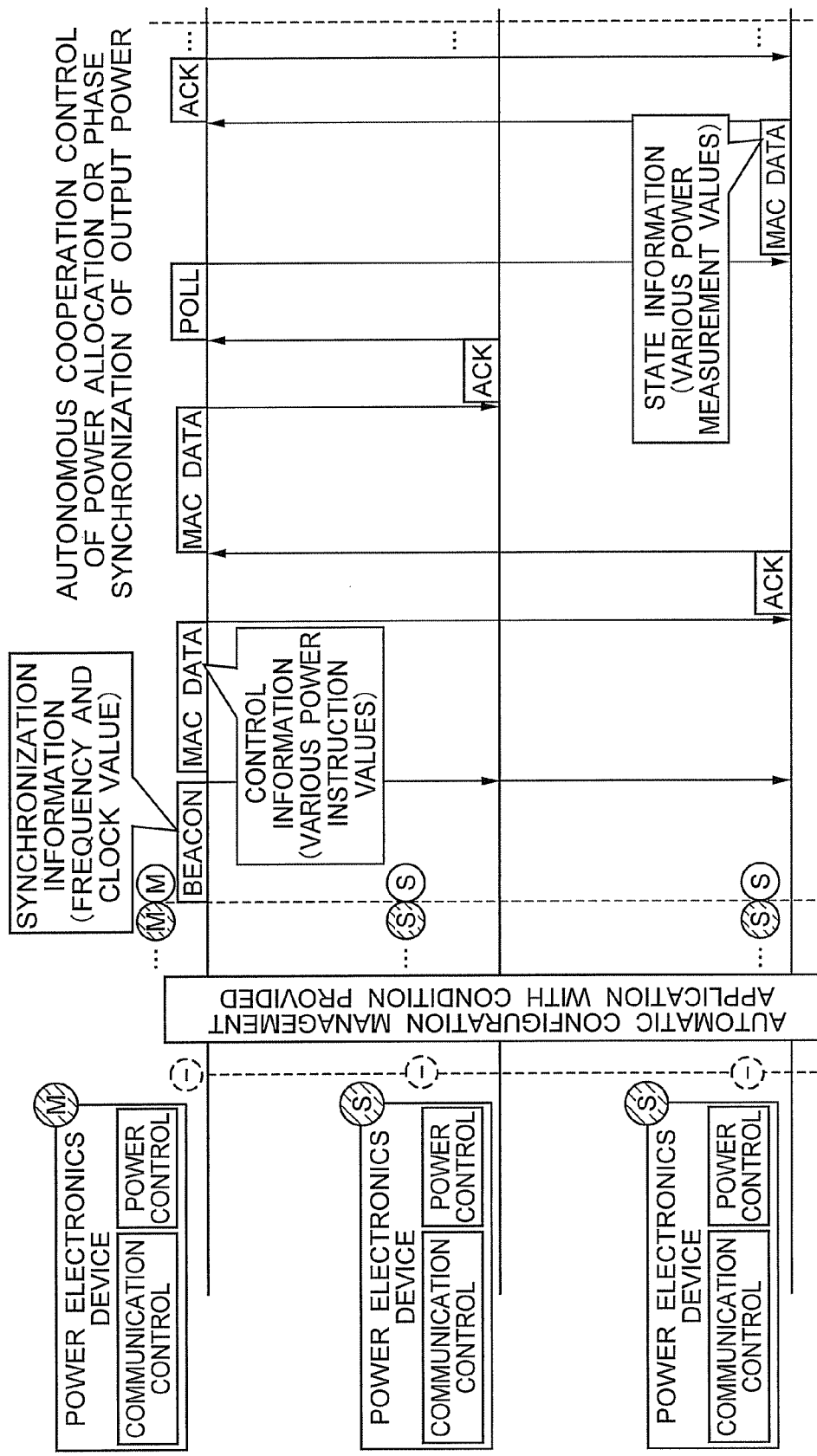
FIG. 17 is a schematic view related to the phase synchronization of output power of a plurality of power electronics devices according to an embodiment.
Figure 18:
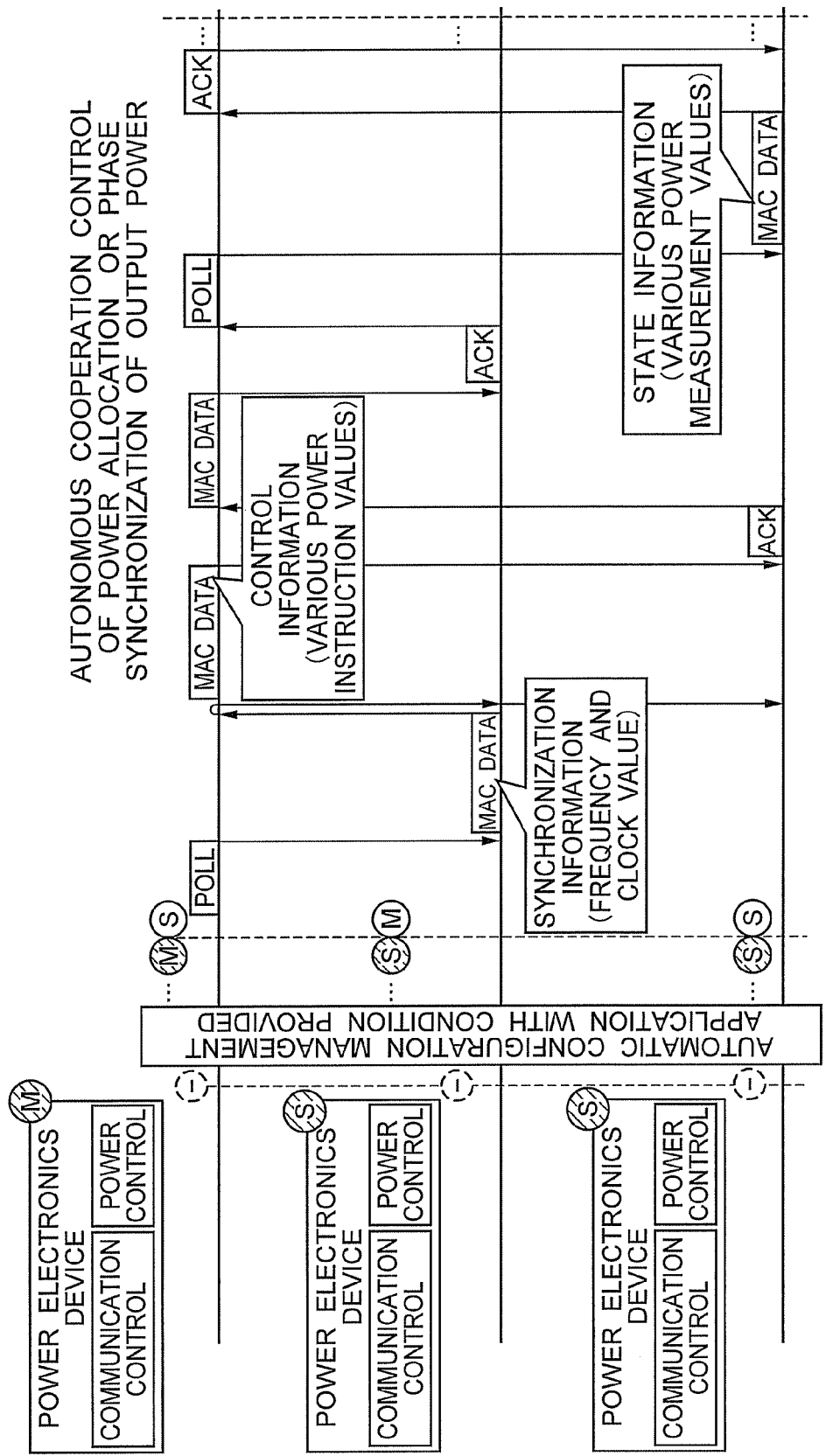
FIG. 18 is a schematic view related to the phase synchronization of output power of a plurality of power electronics devices according to an embodiment.

FIG. 15 illustrates an operation sequence of a system configuration in a case where the power allocation control master does not match the synchronization information transmission device, under the configuration to perform distributed communication processing. FIG. 16 illustrates an operation sequence of a system configuration in a case where the power allocation control master matches the synchronization information transmission device, under the configuration to perform distributed communication processing. FIG. 17 illustrates an operation sequence of a system configuration in a case where the power allocation control master matches the synchronization information transmission device, under the configuration to perform centralized communication processing. FIG. 18 illustrates an operation sequence of a system configuration in a case where the power allocation control master does not match the synchronization information transmission device, under the configuration to perform centralized communication processing. To be more specific, FIG. 15 to FIG. 18 illustrate the communication control of a higher application layer in the automatic configuration management presented in FIGS. 7A and 7B, according to each system configuration in more detail. The sequences in FIG. 15 to FIG. 18 focus on especially a lower data link layer in OSI (Open Systems Interconnection: application layer, presentation layer, session layer, transport layer, network layer, data link layer or physical layer). In FIG. 15 to FIG. 18, characters "M and "S" in circles with hatching show the master and slave of the power allocation control, characters "M" and "S" in outlined white circles show the master and slave of the output power phase synchronization control. "—" in broken line circles shows that the master/slave is not decided yet. "MAC DATA" shows the MAC frame of the MAC layer and "BEACON" shows the beacon frame. "ACK" shows the ACK frame. A diamond figure in front of the MAC frame and the beacon frame shows the back-off time of CSMA/CA communication. "POLL" in FIG. 17 and FIG. 18 shows a polling signal.

Here, FIG. 23 to FIG. 35 show each communication message in an embodiment. These communication messages show the ones of a higher application layer. When they are actually transmitted and received from a communication medium, a communication header for TCP/IP (Transmission Control Protocol/Internet Protocol) or a communication header for UDP/IP (User Datagram Protocol/Internet Protocol) in a transport layer/network layer and a communication header for MAC (Medium Access Control) in a data link layer are added and transmitted and received in a physical layer, that is, by wire communication or wireless communication. Details of these messages are described later.

Although one example case has been illustrated where wireless communication, especially, a wireless LAN as shown in IEEE802.11 is used for a communication medium of the communicating unit in FIG. 15, FIG. 16, FIG. 17 and FIG. 18, an embodiment does not depend on a specific communication medium. Besides this, it is possible to use IEEE802.15.4 or the like as wireless communication, and, even for wire communication, it is possible to apply Ethernet and an optical fiber. The entire operation sequence in the data link layer in FIG. 15 to FIG. 18 is just an example when wireless communication is used.

Generally, in the data link layer, there are a plurality of schemes such as CSMA/CD (Carrier Sense A plurality of Access/Collision Detection: a transmission device detects the collision of communication signals during transmission) as shown in Ethernet and CSMA/CA (Carrier Sense A plurality of Access/Collision Avoidance: communication signals cannot collide while a transmission device performs transmission, and therefore a delivery confirmation is received after transmission) as shown in wireless communication, in addition to a token-ring scheme and a polling scheme, and so on.

Although FIG. 15 to FIG. 18 present the entire operation sequence based on CSMA/CA in wireless communication, as described above, an embodiment does not depend on a specific data link layer or a physical layer. In CSMA/CA, after communication messages in the MAC layer (the TCP/IP communication header or the UDP/IP communication header and the MAC layer communication header are added to the communication messages in FIG. 23 to FIG. 35) are transmitted, a delivery confirmation (ACK) from the transmission destination is received in case of data (MAC DATA) of the unicast type. In a case where it is not possible to receive the delivery confirmation within a predetermined period of time, a communication message is transmitted again.

Generally, since each device that participates in the system can transmit and receive a general-purpose communication message at an arbitrary timing in the distributed communication processing, as presented in FIG. 15 and FIG. 16, the process of automatic configuration management (master/slave decision) is implemented. Afterwards, in addition to general-purpose communication such as communication of a control instruction and a control state, synchronous communication to notify the slave synchronization information of the master to the slave is performed as shown in the output power phase synchronization control. Therefore, it is considered that it becomes difficult to realize a function depending on a device of the signal synchronization source. To be more specific, in the distributed communication processing (called "ad-hoc communication" in wireless communication), there is a case where a communication message is relayed by each device in a mesh system. When the communication message is relayed, in a case where clock information notification is required at high accuracy like synchronization information, transfer delay fluctuation due to the relay can occur. From this, here is a problem that the realization of autonomous cooperation control of the phase synchronization of output power is limited to a specific device (for example, the acquisition of clock information and the attachment to a communication message are not implemented in a coordinated manner by hardware/software, and all are realized by hardware).

Therefore, in order to realize the synchronization of phase synchronization of output power of autonomous cooperation control in the distributed communication processing without depending on a specific communication medium, it is preferable to select a device housing the largest number of other devices as the master of the output power phase synchronization control that is the transmission source of synchronization information, and prevent an unnecessary relay of the synchronization information. Alternatively, a device with the largest reception signal intensity from other devices may be set to the master. For example, it may be possible to measure the reception intensity for a certain period, compare the measured maximum signal intensity or the average intensity between devices, and decide a device with the largest intensity as the master.

As described above, as for the general-purpose communication and the synchronous communication, it is possible to consider a mode in which the general-purpose communication and the synchronous communication are separated, in addition to a mode in which they are integrally treated in the communicating unit of one power electronics device (for example, a synchronous function is provided in the data link layer in the example of IEEE802.11 wireless communication). That is, it is possible to consider a mode in which the communicating unit of a certain power electronics device transmits and receives a communication message such as a control instruction as the master of power allocation control and performs the general-purpose communication and another power electronics device implements a phase synchronization master, and a mode in which these functions are individually realized in one power electronics device.

Communication attribute information in an embodiment may include information on a communication control configuration in the system such as distributed communication processing and centralized communication processing and information on application configurations of general-purpose communication and synchronous communication, besides information on another device connected in a communication part and information on the role in the communication control in the other device (a base station in the centralized control, etc.), and so on.

FIG. 17 illustrates a case where the master of power allocation control matches a synchronization information transmission device under a configuration to perform centralized communication processing. Meanwhile, FIG. 18 illustrates a case where the master of the power allocation control does not match the synchronization information transmission device under the configuration to perform the centralized communication processing.

Although these figures describe one example of processing in the data link layer and the physical layer as shown in wireless communication such as IEEE802.11, as described above, an embodiment does not depend on a specific communication medium.

Here, the centralized communication (for example, base station communication in wireless communication) has a restriction that a slave set housed in the base station cannot mutually perform communication in a case where the base station is not set. Therefore, in the procedure of the automatic configuration management in FIG. 17 and FIG. 18, under conditions that the base station is already set and operated, each power electronics device transmits and receives a communication message related to configuration management to decide the master and the slave.

On the other hand, when synchronization information related to a control instruction, control state and phase synchronization such as power allocation control and output power phase synchronization control is transmitted and received after the automatic configuration management, a communication message transmitted by a slave set is forwarded to another slave through the base station. Therefore, similar to the above-mentioned distributed communication processing, in view of the enhancement of the synchronization accuracy, it is preferable to decide the master of the output power phase synchronization control (the transmission source of the synchronization information) such that a communication message related to synchronization is not relayed. Therefore, as illustrated in FIG. 17 and FIG. 18, it is preferable to select the master of the output power phase synchronization control (the transmission source of the synchronization information) as the base station and further adjust the master of the power allocation control thereto in consideration of the communication efficiency.

Here, although an example is shown where synchronization information includes a beacon signal (BEACON) of the data link layer in wireless communication such as IEEE802.11 in the examples in FIG. 15 to FIG. 18, an embodiment does not depend on a specific communication medium. For example, it is possible to use a communication message of an application layer as illustrated in FIG. 33 described later or use a mode such as direction notification of a pulse signal using an optical fiber or the like instead of the communication message.

Although the synchronization information is transmitted and received from a synchronous communication unit in the communicating unit of a power electronics device, as for general-purpose communication and synchronous communication in the communicating unit, a mode in which they are integrally treated as one hardware/software, a mode in which they are separated as individual hardware/software and a mode in which they are allocated on different devices are considered.

Figure 19A:
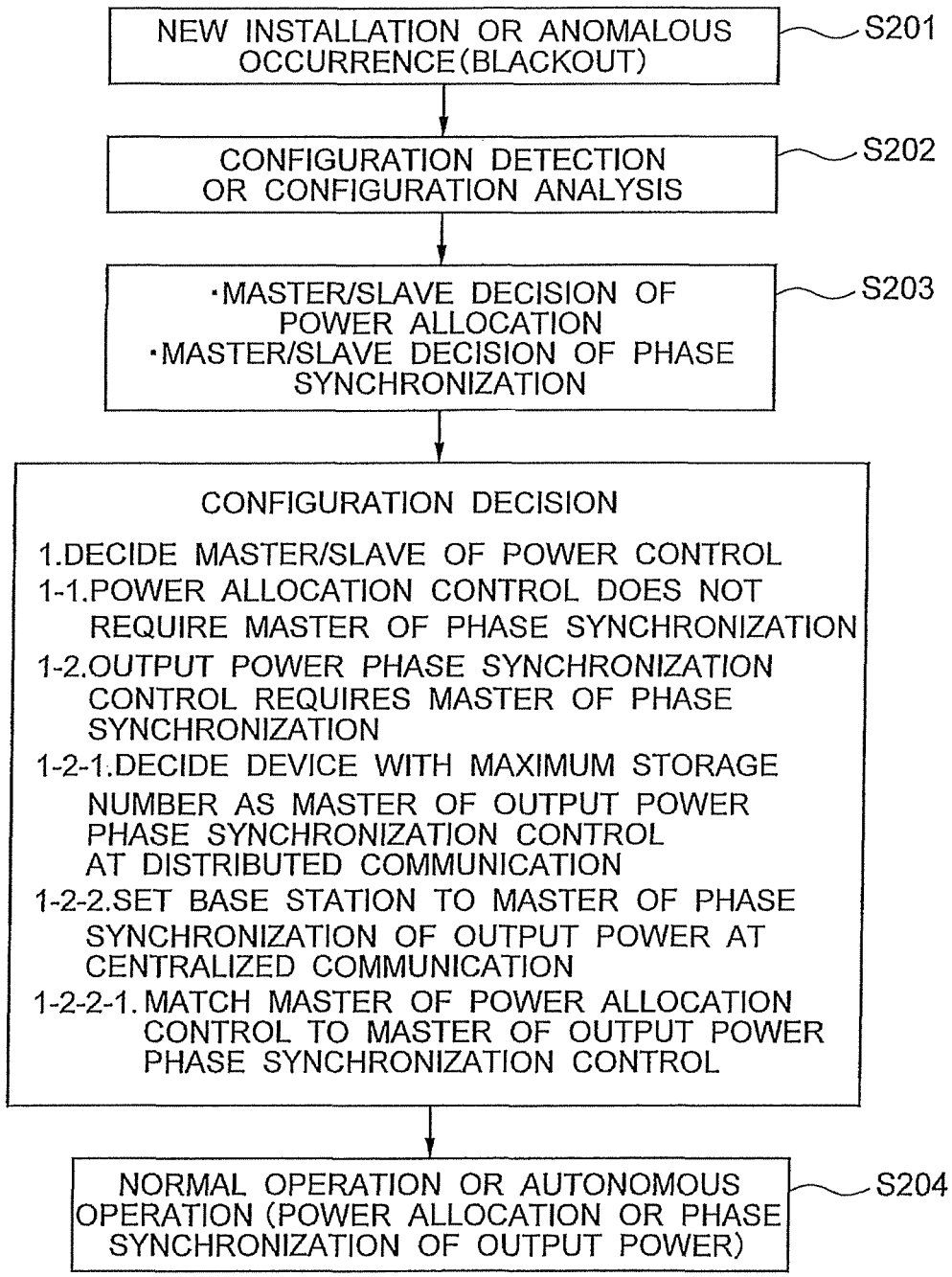

FIG. 19A illustrates a flow related to a master/slave decision procedure of power allocation control and output power phase synchronization control based on these features. In automatic configuration management at the time of new installation or anomalous occurrence (blackout) (S201), the master/slave decision is performed for at least the power allocation control out of the power allocation control and the output power phase synchronization control at the time of configuration detection or configuration analysis (S202 and S203). The decision procedure at this time is embodied. The decision procedure is as follows. Here, although the master/slave of the power allocation control has been decided earlier in this example, it is also possible to decide the master/slave of the communication control (phase synchronization) earlier.

The operation of the master-slave decision starts (1). At this time, in a case where only the power allocation control is performed, the master of the output power phase synchronization control (phase synchronization) is not necessary (1-1). Therefore, the master/slave decision of the output power phase synchronization control is not performed and only the master/slave decision of the power allocation control is performed. A specific example in this case is illustrated in case 1 in FIG. 19B.

On the other hand, in a case where the output power phase synchronization control is necessary, the master for phase synchronization is necessary. Therefore, the master/slave decision of the output power phase synchronization control is performed in addition to the master/slave decision of the power allocation control (1-2). When the master of the output power phase synchronization control is decided, in the case of the distributed communication, a device in which the number of devices under the same device is maximum or equal to or greater than a threshold is decided as the master of the phase synchronization. A specific example in this case is illustrated in case 2 in FIG. 19B.

On the other hand, in the case of the centralized communication, a device that becomes a base station (master station) or a device in which the number of devices under the same device is maximum or equal to or greater than a threshold is decided to the master of the phase synchronization. Further, the master of the power allocation control may be matched with the master of the output power phase synchronization control (phase synchronization master). When the master of the power allocation control and the master of the output power phase synchronization control are matched, it is preferable to set the base station as a candidate. A specific example in this case is illustrated in case 3 in FIG. 19B.

Afterwards, it shifts to a state of normal operation or self-operation (power allocation control or output power phase synchronization control) (S204).

In an embodiment, an explanation has been given above focusing on autonomous cooperation control for power allocation or phase synchronization of output power by a plurality of power electronics devices. Next, using FIGS. 22A and 22B, FIG. 23 and FIG. 24, an embodiment is given where these functions are further advanced when a power electronics device cooperates with a smart meter.

When the power electronics device realizes the functions of the power allocation and the phase synchronization of output power, index calculation of specific input/output electric energy is decided on the basis of instruction information from an individual power electronics device. Meanwhile, when an EMS or local controller and a power electronics device that manage the balance of power supply and demand in the power system or customer's equipment are linked by EMS cooperation as presented in FIG. 5, it is possible to correctly grasp the whole power supply quantity and power demand quantity, it is possible to decide the input/output electric energy more accurately.

Figure 20:
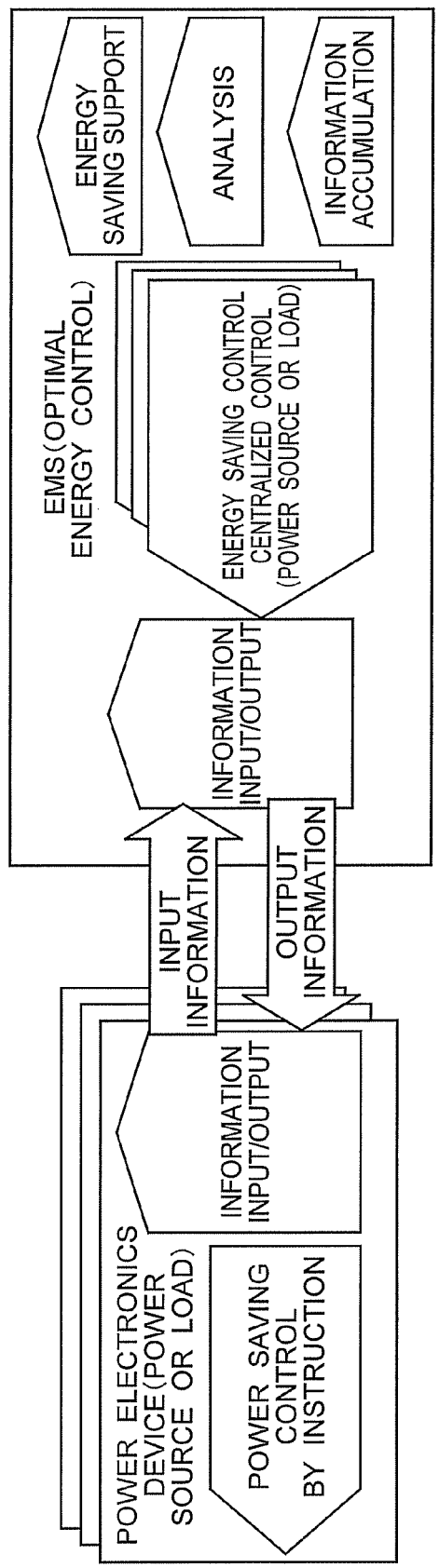
FIG. 20 is a coordinated operation diagram of a power electronics device and a smart meter according to an embodiment.

As illustrated in FIG. 20, a general EMS such as a μEMS, BEMS, FEMS and HEMS acquires information on the operation state, electric energy, heat quantity, temperature difference, pressure and flow rate, and so on, from one or a plurality of individual devices or various sensors, implements information accumulation, analysis and power saving support (visualization) in view of energy optimization control, and implements centralized control (power source or load) as specific energy saving control. For example, the power source is an energy storage or a solar power generation device, and the load is an instrument such as air-conditioning, illumination and motor.

A specific example of control by the EMS is assumed to include production control such as device operation start stop, temperature setting, pulp control and motor control, in addition to an instruction related to power control as described in an embodiment. An individual device interprets the instruction content of the EMS, operates based on it and feeds back the operation result to the EMS.

Figure 21:
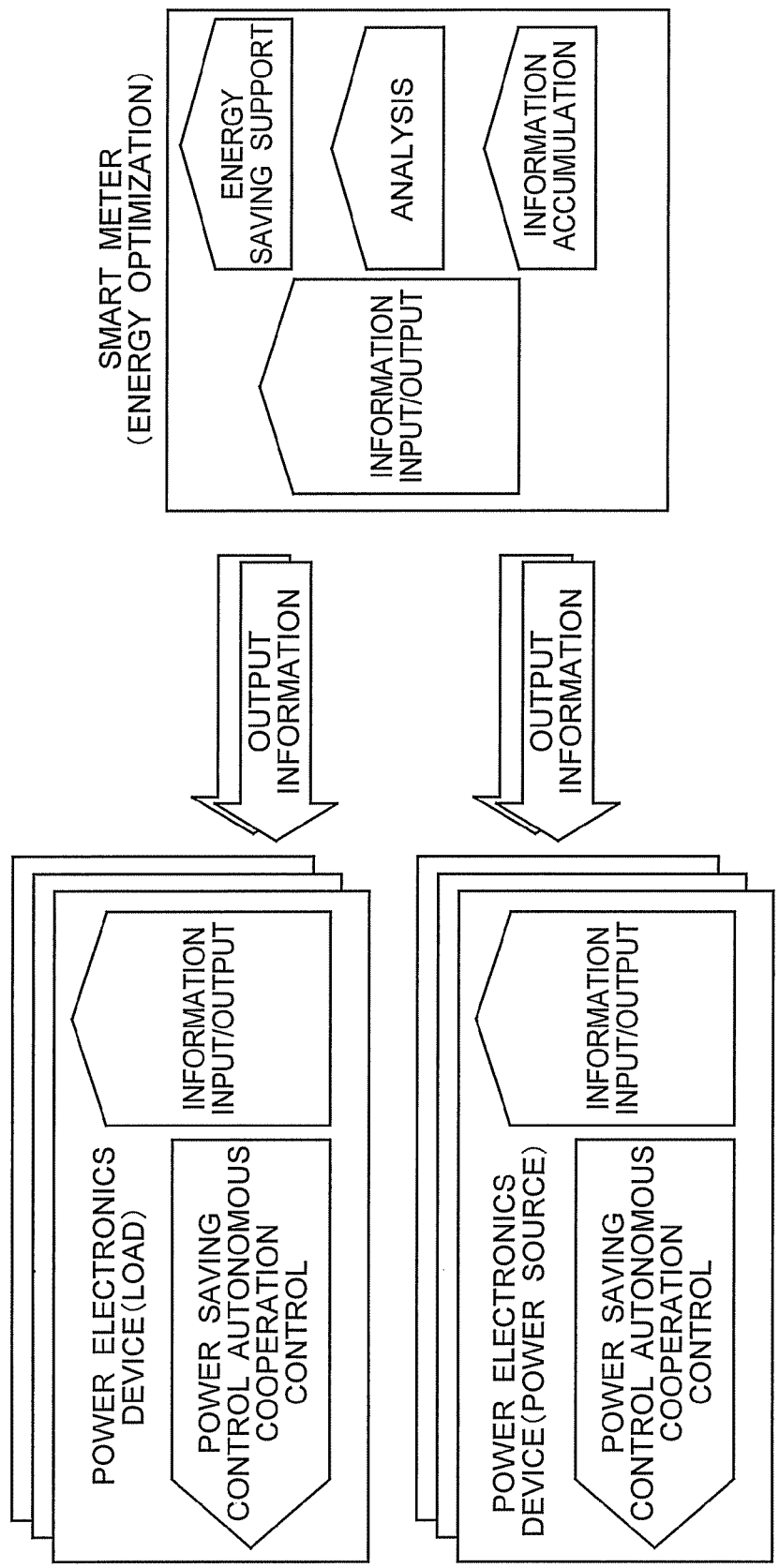
FIG. 21 is a coordinated operation diagram of a power electronics device and a smart meter according to an embodiment.

Although FIG. 20 illustrates a configuration of cooperation with individual power electronics devices with respect to the EMS, a configuration of cooperation with individual power electronics devices with respect to a smart meter is also as possible as illustrated in FIG. 21. To be more specific, a smart meter realizes information on electric energy, heat quantity, temperature difference, pressure and flow rate, and so on, in view of accumulation and analysis of information and power saving support (visualization). As seen from the compassion between FIG. 20 and FIG. 21, the illustrated smart meter corresponds to the functions of the EMS illustrated in FIG. 20 from which the functions of energy saving control and centralized control are removed, and mounts the functions of energy saving control and autonomous cooperation control in a power electronics device.

An analog measurement that is the antecedent of the smart meter is specialized in measurement, and has the role of a sensor that accumulates measurement information on the power, the gas and the water every facility or floor in the customer's equipment. By mounting a function of information communication (information input/output) in addition to change from such an analog measurement function to a digital measurement function, the smart meter can cooperate with a device inside/outside the customer's equipment and present demand prediction information or perform power saving support for the customer's equipment.

Especially, the smart meter is classified for the power, the gas and water, but there may be a configuration in which these are integrally treated in addition in which these are separated and treated individually. Moreover, it is possible to classify it into a dealing meter (parent meter) to cooperate with MDMS of a power company or an external business operator, and a internal meter (child meter or sub-meter) installed in an individual floor or the like in the customer's equipment, and so on.

There is a case where the dealing smart meter cooperates with MDMS inside/outside the customer's equipment, mediates or interprets a suppression request (demand response signal) decided based on information on supply and demand prediction, and performs energy optimization in the customer's equipment. In view of such an intelligent stream, by adopting not only a configuration of an EMS and individual power electronics devices but also a cooperative configuration of a smart meter and individual power electronics devices as illustrated in FIG. 21, it is possible to solve a problem that the function mounted on the EMS becomes excess, depending on the circumstance. "Excess" means to mount even the function of load control in a system that controls a energy storage or solar energy, and mount the function such as monitoring control of many devices in a system in which it only has to perform monitoring control of a small number of power electronics devices.

As a result of this, by performing autonomous cooperation control of a plurality of power electronics devices described above in an embodiment, it is possible to decide the input/output amount at an optimal level every area such as a floor, in addition to a flexible system configuration and the throughput increase of power input/output.

Although each power electronics device operates based on an instruction of the EMS in the EMS cooperation configuration illustrated in FIG. 20, in the smart meter cooperation configuration illustrated in FIG. 21, a device acquires the operation state, electric energy, heat quantity, temperature difference, pressure and flow rate, and so on, of facilities or floors from the smart meter, the device itself correctly understands the controlled amount of autonomous cooperation control (energy saving control or electric energy control of power allocation or phase synchronization of output power), and it is possible to prevent an excessive power output or power input. For example, a table that associates the measurement type and measurement amount of the smart meter with the power input/output amount of the device is prepared, the power input/output amount which the device should treat may be decided from information on an acquired measurement amount and the table, and the input/output of power of the decided amount may be controlled.

Here, the smart meter does not depend on a specific mode such as a configuration to treat the power, the gas and the water integrally, a configuration to separate them individually, a configuration that there are a dealing meter (parent meter) with an external business operator and an internal meter (child meter or sub-meter) in individual customer's equipment.

Figure 22A:
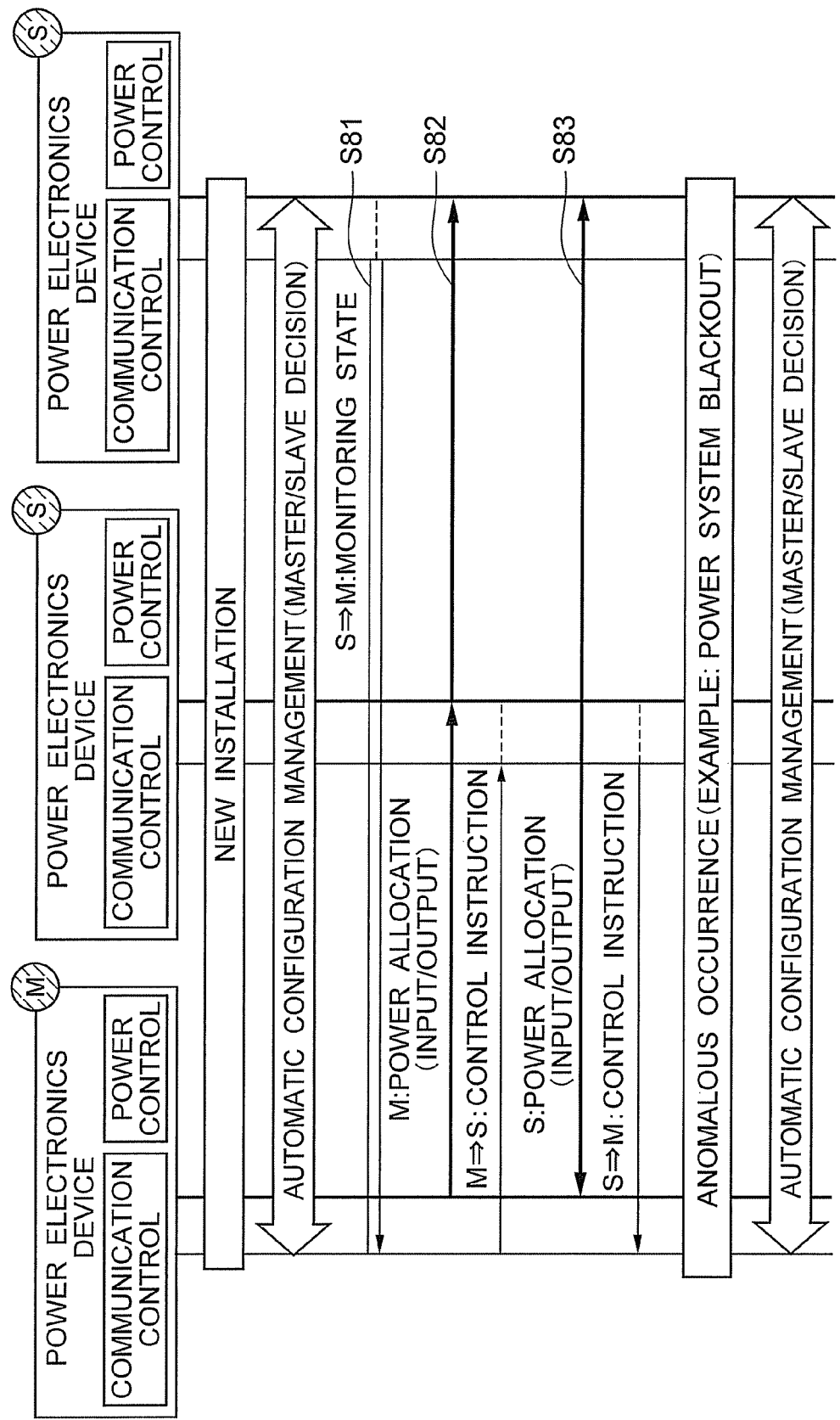

FIGS. 22A and 22B illustrate an operation sequence example in a system configuration in which power electronics devices and a smart meter cooperate. The different point from FIGS. 7A and 7B is that the power electronics device of the unit number 3 illustrated in FIG. 7A is replaced with the smart meter, the power electronics device monitors information (state) of the smart meter (S81 and S84) and the smart meter monitors the power input/output amount (S82, S83, S85 and S86). That is, the power electronics device acquires the necessary electric energy or the like from the smart meter or the like and decides the controlled amount (input/output amount), and so on, and the smart meter does not input and output the power and measures the power that flows in a power line. The smart meter can be the target of automatic configuration management, and, in this case, the smart meter has the lowest master priority and only has to be treated as a slave (see FIG. 11).

FIG. 23 to FIG. 35 present the configurations of communication messages transmitted and received by a power electronics device of an embodiment.

Figure 31:
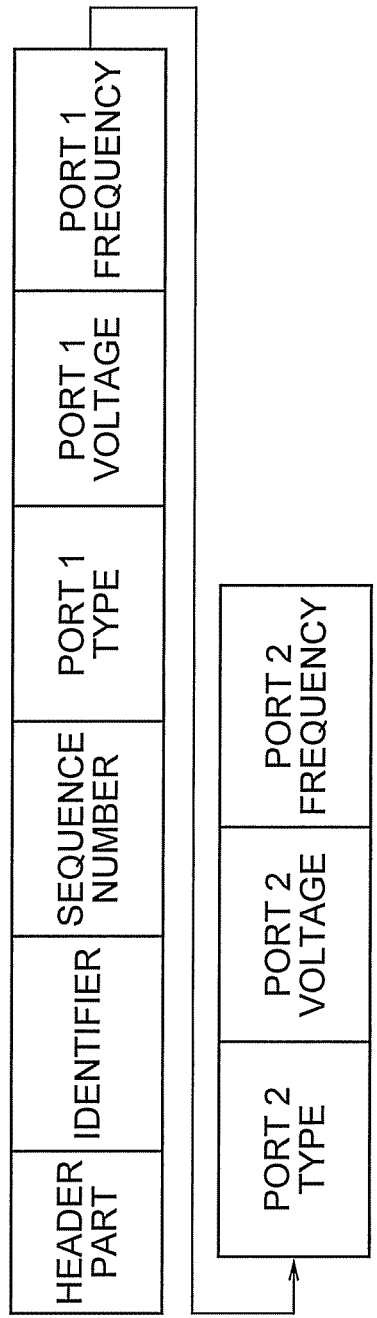
FIG. 31 illustrates a communication message configuration example of power wire connection acknowledgement according to an embodiment.
Figure 32:
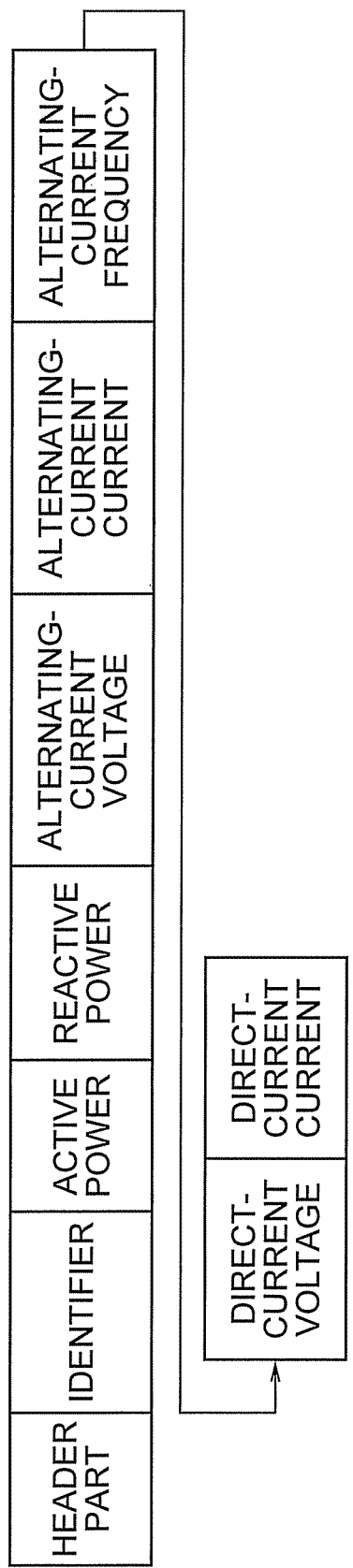
FIG. 32 illustrates a communication message configuration example of a control instruction according to an embodiment.
Figure 34:
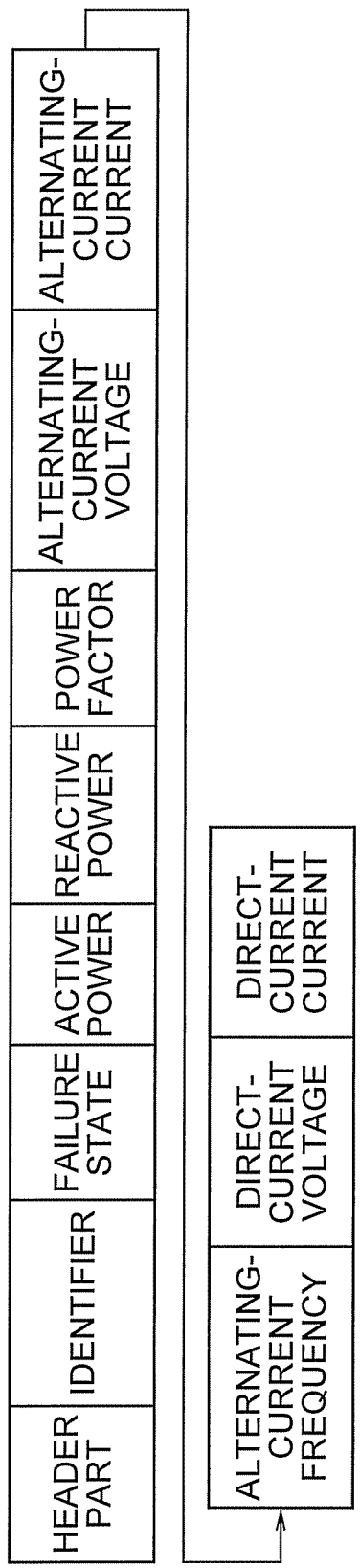
FIG. 34 illustrates a communication message configuration example in a control state according to an embodiment.

FIG. 23 to FIG. 31 illustrate communication messages related to automatic configuration management, FIG. 32 to FIG. 34 illustrate communication messages related to the control instruction and state monitoring of power control (power allocation control and output power phase synchronization control), and FIG. 35 illustrates a communication message related to measurement amount information managed by the smart meter. Each communication message starts from the header part, and the header part includes the data length (information to express the length of a data part in units of byte numbers), the data type (information to identify the content of the data part body), the unit number (information to express the unique code or the production number of each device) and date information (time information attached by the communication message transmission source device). In addition, a communication header for TCP/IP (Transmission Control Protocol/Internet Protocol) and a MAC layer header or the like are added before the header part, and the result is transmitted and received on a communication network.

FIG. 23 to FIG. 31 illustrate communication messages related to automatic configuration management.

FIG. 23 illustrates a communication message related to an advertisement. As the advertisement type, it is possible to express the existence advertisement, the update advertisement and the separation advertisement. When a certain device notifies its own existence to other devices, it sets the advertising type to "Existence advertisement" and performs broadcast/multicast communication at constant period intervals at the time of initial startup. At the time of notifying the operation state or system configuration change of the own device to other devices, it sets the advertisement type to "update advertisement" and performs broadcast/multicast communication. When the device finishes operation, it sets the advertisement type to "separation advertisement" and performs broadcast/multicast communication.

FIG. 24 illustrates a communication message related to a search request. While the advertisement message is used by each device to notify its own existence actively, a search request message is used to make an inquiry. At this time, the search request message is transmitted in the form of broadcast/multicast communication. The communication timing is arbitrary. A power electronics device which receives the search request message waits for a random time period within a range of time designated by the maximum wait time to prevent the collision of communication messages, and thereafter replies a search response message.

FIG. 25 illustrates a communication message related to the search response. Although it is almost the same configuration as the advertisement message, it is different therefrom in transmitting it by unicast to the power electronics device that transmitted the search request message.

Figure 26:
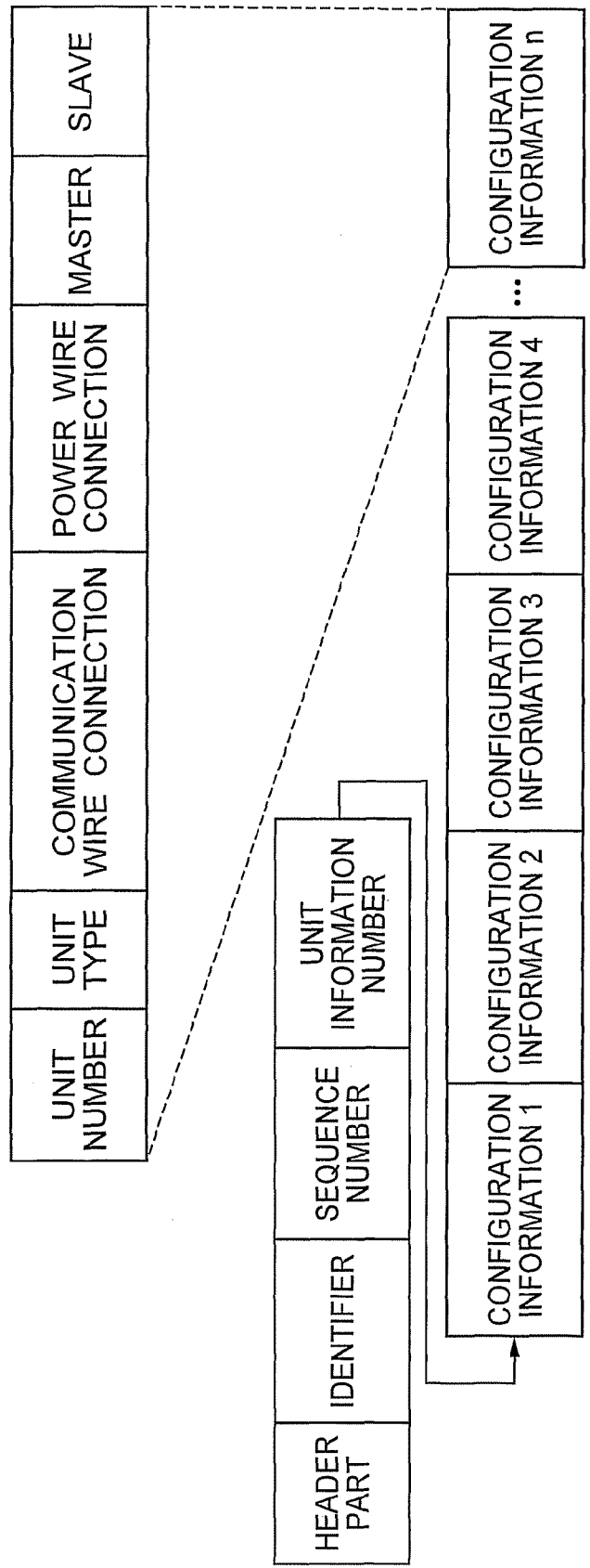
FIG. 26 illustrates a communication message configuration example of a configuration information write request according to an embodiment.

FIG. 26 illustrates communication message related to a configuration information write request. It includes the sequence number (used for retransmission control of a communication message), the unit information number (the number of items of unit information included in configuration information) and configuration information (the unit number, the unit type, the communication wire connection information number, the power wire connection information number, the slave information number, master information, communication wire connection information, power wire connection information and slave information). In the case of using TCP/IP, although retransmission communication control is implemented, in the case of using UDP/IP (User Datagram Protocol/Internet Protocol), it is preferable to implement retransmission control by a predetermined number of times using the sequence number as illustrated in FIG. 26.

FIG. 27 illustrates a communication message related to a configuration information write response. This communication message is a response message with respect to the write request and notifies the completion of reception and internal storage of configuration information. The sequence number reflects the content at the time of the reception of the configuration information write request message.

Figure 29:
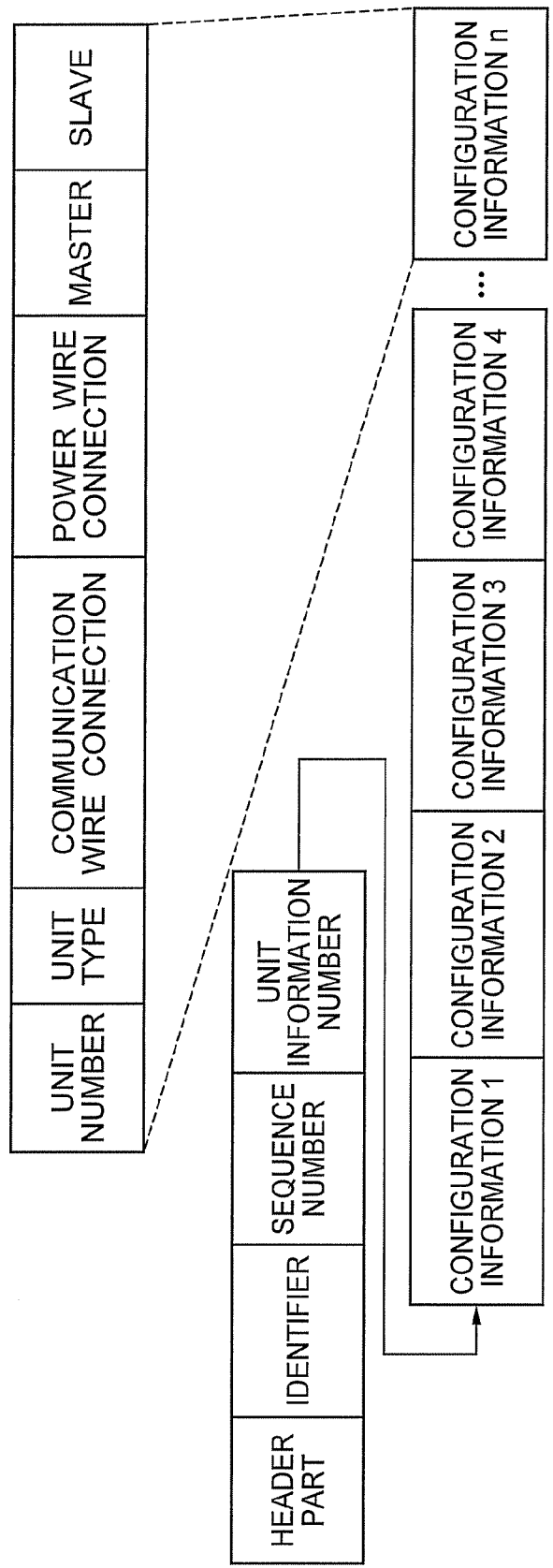
FIG. 29 illustrates a communication message configuration example of a configuration information read response according to an embodiment.

FIG. 28 illustrates a configuration information read request, FIG. 29 illustrates a communication message related to a configuration information read response, which basically follows the content of the communication messages of the request (FIG. 26) and response (FIG. 27) related to the writing.

FIG. 30 illustrates a communication message related to a power wire connection acknowledgement request, and FIG. 31 illustrates a communication message related to a power wire connection acknowledgement response. A power electronics device having received the power wire connection acknowledgement request acquires information on the type, the voltage and the frequency from a power inputting unit and a power outputting unit, and generates and transmits a communication message of the power wire connection acknowledgement response. In a case where the information on the type, the voltage and the frequency is the same (or within a range of a predetermined threshold), based on the content of the communication message related to the response, the transmission source of the power wire connection acknowledgement request determines that power electronics devices are mutually located on the same power bus. Here, a method of detecting that they are located on the same power bus line is not limited to this method. Here, as for the grasping of communication wire connection, in a case where a communication message of automatic configuration management is directly received, it is determined that they are on the same communication line.

FIG. 32 illustrates a message to notify control content which a master power electronics device (or an EMS or a local controller) instructs to a slave power electronics device at the time of operation of autonomous cooperation control for power allocation or phase synchronization of output power.

Moreover, FIG. 33 illustrates a communication message for synchronous communication at the time of output power phase synchronization control. It includes frequency information (for example, 50 Hz/60 Hz in Japan) to generate an alternating-current waveform and a phase error or phase information (clock information for synchronization).

FIG. 34 illustrates a communication message to notify information by which the master monitors the operation state of the slave. This communication message is transmitted from the slave power electronics device to the master power electronics device (or an EMS or a local controller).

FIG. 35 illustrates a communication message related to sensor information on the power, heat quantity, temperature difference, pressure amount and flow rate or the like which that the smart meter measures. In the example in the figure, one example of the communication message is illustrated in a case where one smart meter integrally treats the meter-reading of electricity, gas and water, but, in a case where the meter for electricity, the meter for gas and the meter for water are separated, the content of the communication message is treated separately. For example, this communication message is transmitted from the smart meter to the master power electronics device (or an EMS or a local controller).

As described above, according to embodiments, there are provided power electronics devices, power conversion method and a power conversion program that perform dynamic configuration management between a plurality of different power electronics devices and acquire an effect of increasing the throughput of power input/output by cooperated driving while securing the flexibility and movability of operation.

The power electronics devices which have been heretofore described may also be realized using a general-purpose computer device as basic hardware. That is, the power electronics devices can be realized by causing a processor mounted in the above described computer device to execute a program. In this case, the power electronics device may be realized by installing the above described program in the computer device beforehand or may be realized by storing the program in a storage medium such as a CD-ROM or distributing the above described program over a network and installing this program in the computer device as appropriate. Furthermore, the storage in the power electronics device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A power electronics device comprising:
a first connector for connecting with a first power line of a plurality of power lines;
a second connector for connecting with a second power line of the power lines;
a power converter for converting power input from one of the first and second connectors and output converted power to the other of the first and second connectors;
a communicator for performing communication with power electronics devices different from the power electronics device; and
a controller for acquiring power attribute information and communication attribute information of the power electronics devices different from the power electronics device using the communicator, and for selecting a first power electronics device and a second power electronics device out of the power electronics device and the power electronics devices different from the power electronics device based on the acquired power attribute information, the acquired communication attribute information, power attribute information of the power converter and communication attribute information of the communicator, the first power electronics device being a master of power allocation control of electric energy that the power electronics devices connected to one power line of the power lines performs input and output on the one power line, and the second power electronics device being a master of output power phase synchronization control of power which the power electronics devices connected to the one power line output to the one power line.

2. The device according to claim 1, wherein the controller judges whether to perform the output power phase synchronization control on the one power line, based on a previously given condition, and, in a case of deciding not to perform the output power phase synchronization control, does not select the second power electronics device.

3. The device according to claim 2, wherein, in a case where the power electronics device connected to the one power line can receive a reference signal for phase synchronization from outside, the controller decides not to perform the output power phase synchronization control on the one power line.

4. The device according to claim 2, wherein, in a case where the power electronics devices connected to the one power line perform input and output of direct-current power on the one power line, the controller decides not to perform the output power phase synchronization control on the one power line.

5. The device according to claim 1, wherein:
the communicator includes a synchronous communicator for communication synchronization information for the output power phase synchronization control and a general-purpose communicator for communicating information different from the synchronization information; and
the controller employs, as the communication attribute information, communication attribute information of the synchronous communicator and communication attribute information of synchronous communicators of the different power electronics devices.

6. The device according to claim 5, wherein the controller selects the second power electronics device based on which of centralized communication and distributed communication the different power electronics devices and the synchronous communicator perform.

7. The device according to claim 6, wherein, in a case where the different power electronics devices and the synchronous communicator perform the distributed communication, the controller selects the second power electronics device according to a number of the power electronics devices with which each of the different power electronics devices and the synchronous communicator can connect.

8. The device according to claim 6, wherein, in a case where the different power electronics devices and the synchronous communicator perform the distributed communication, the controller selects the second power electronics device according to intensity of signals which each of the different power electronics devices and the synchronous communicator receives from the power electronics devices other than itself.

9. The device according to claim 6, wherein, in a case where the different power electronics devices and the synchronous communicator perform the centralized communication, the controller selects the second power electronics device according to which role of a base station and a slave station the different power electronics devices and the power electronics device including the synchronous communicator play.

10. The device according to claim 9, wherein the controller selects, as the second power electronics device, a power electronics device that plays a role of the base station out of the different power electronics devices and the power electronics device including the synchronous communicator.

11. The device according to claim 10, wherein the controller selects, as the first power electronics device, same device as the second power electronics device.

12. A power electronics device comprising:
a first connector for connecting with a first power line of a plurality of power lines;
a second connector for connecting with a second power line of the power lines;
a power converter for converting power input from one of the first and second connectors and output converted power to the other of the first and second connectors;
a communicator for performing communication with at least power electronics devices different from the power electronics device out of the different power electronics devices and a power measurement device; and
a controller for acquiring power attribute information of the different power electronics devices using the communicator, and selecting from the power electronics device and the different power electronics devices, a master of power allocation control of electric energy that the power electronics devices connected to one power line of the power lines perform input and output on the one power line, based on the acquired power attribute information and power attribute information of the power converter,
wherein the master collects measurement information of the power measurement device by communication with the power measurement device or communication with at least one of the power electronics devices other than the master, and performs the power allocation control based on the measurement information.

13. A cooperative control method comprising:
acquiring power attribute information and communication attribute information on power electronics devices which are interconnected through a plurality of power lines, the power electronics devices each converting power input from the power line connected thereto and outputting the converted power to another power line connected thereto; and
selecting a first power electronics device and a second power electronics device from the power electronics devices, based on the acquired power attribute information and the acquired communication attribute information,
the first power electronics device being a master of power allocation control of electric energy that the power electronics devices connected to one power line of the power lines perform input and output on the one power line, and
the second power electronics device being a master of output power phase synchronization control of power which the power electronics devices connected to the one power line output to the one power line.

14. A cooperative control method comprising:
acquiring power attribute information on power electronics devices which are interconnected through a plurality of power lines, the power electronics devices each converting power input from the power line connected thereto and outputting the converted power to another power line connected thereto;
selecting, from the power electronics devices, a master of power allocation control of electric energy that the power electronics devices connected to one power line of the power lines perform input and output on the one power line, based on the acquired power attribute information; and
collecting, by the master, measurement information of a power measurement device via communication with the power measurement device or communication with at least one of the power electronics devices other than the master, and performing the power allocation control based on the measurement information.

15. A non-transitory computer readable medium including instructions stored therein which cause, when executed by a processor, the computer to execute:
acquiring power attribute information and communication attribute information on power electronics devices which are interconnected through a plurality of power lines, the power electronics devices each converting power input from the power line connected thereto and outputting the converted power to another power line connected thereto; and
selecting a first power electronics device and a second power electronics device from the power electronics devices, based on the acquired power attribute information and the acquired communication attribute information,
the first power electronics device being a master of power allocation control of electric energy that the power electronics devices connected to one power line of the power lines perform input and output on the one power line, and
the second power electronics device being a master of output power phase synchronization control of power which the power electronics devices connected to the one power line output to the one power line.

16. A non-transitory computer readable medium including instructions stored therein which cause, when executed by a processor, the computer to execute:
acquiring power attribute information on power electronics devices which are interconnected through a plurality of power lines, the power electronics devices each converting power input from the power line connected thereto and outputting the converted power to another power line connected thereto;
selecting, from the power electronics devices, a master of power allocation control of electric energy that the power electronics devices connected to one power line of the power lines perform input and output on the one power line, based on the acquired power attribute information; and collecting, by the master, measurement information of a power measurement device via communication with the power measurement device or communication with at least one of the power electronics devices other than the master, and performing the power allocation control based on the measurement information.

* * * * *